US012694391B2

(12) United States Patent
Glass et al.

(10) Patent No.: US 12,694,391 B2
(45) Date of Patent: Jul. 28, 2026

(54) SYSTEMS, METHODS, AND COMPUTER-READABLE MEDIA FOR DYNAMICALLY GENERATED GIFT CARDS

(71) Applicant: Gift Card Market, LLC, Belton, MO (US)

(72) Inventors: Brett R. Glass, Belton, MO (US); Karl Joseph Geisler, Olathe, KS (US)

(73) Assignee: Gift Card Market, LLC, Belton, MO (US)

( * ) Notice: Subject to any disclaimer, the term of this patent is extended or adjusted under 35 U.S.C. 154(b) by 0 days.

(21) Appl. No.: 18/388,664

(22) Filed: Nov. 10, 2023

(65) Prior Publication Data

US 2024/0386413 A1     Nov. 21, 2024

Related U.S. Application Data

(60) Provisional application No. 63/467,108, filed on May 17, 2023.

(51) Int. Cl.
G06Q 20/34 (2012.01)

(52) U.S. Cl.
CPC ....... G06Q 20/3433 (2013.01); G06Q 20/354 (2013.01)

(58) Field of Classification Search
None
See application file for complete search history.

(56) References Cited

U.S. PATENT DOCUMENTS

| | | | |
|---|---|---|---|
| 8,245,910 B2 | 8/2012 | Sullivan et al. | |
| 8,464,938 B2 | 6/2013 | Briscoe et al. | |
| 8,622,291 B2 | 1/2014 | Sullivan et al. | |
| 8,973,820 B2 | 3/2015 | Milner et al. | |
| 10,769,705 B2 * | 9/2020 | Erez | G06Q 20/12 |
| 2011/0251962 A1 * | 10/2011 | Hruska | G06Q 20/4012 705/72 |
| 2013/0041821 A1 * | 2/2013 | Kingston | G06Q 40/02 705/44 |
| 2014/0207612 A1 * | 7/2014 | Isaacson | G06Q 40/02 705/26.8 |
| 2014/0214626 A1 * | 7/2014 | Bowers | G06Q 30/0635 705/26.81 |
| 2016/0005028 A1 * | 1/2016 | Mayblum | G06Q 20/0457 705/26.81 |
| 2018/0040057 A1 * | 2/2018 | Erez | G06Q 20/12 |
| 2021/0174338 A1 * | 6/2021 | Isaacson | G06Q 40/02 |
| 2021/0258320 A1 * | 8/2021 | Butler | H04L 63/102 |

\* cited by examiner

*Primary Examiner* — David P Sharvin
(74) *Attorney, Agent, or Firm* — Erise IP, P.A.

(57) ABSTRACT

Systems, methods, and computer-readable media for dynamic gift cards are disclosed. A graphical user interface provided by which a gifting user may obtain a gift card for a receiving user. The graphical user interface may be accessible via an embedded application. The gifting user may search for a merchant to obtain a gift card for via the graphical user interface. Search services may then be queried to obtain information relating to the merchant, and the information may be presented to the gifting user for selection of a merchant. Once selected, pre-approval of the gift card may be obtained; however, issuance may be prevented until the recipient accepts the gift card. A message may be automatically generated for the gifting user to directly send to the recipient that enables the recipient to accept the gift card. A preview of the gift card may be rendered based on the queried information.

20 Claims, 12 Drawing Sheets

| Receive Recipient Information | — 602 |

| Analyze Information to Determine Suggestions | — 604 |

| Receive Merchant/Merchant Category Selection | — 606 |

| Communicate Information to Card Issuer | — 608 |

| Render Gift Card Preview | — 610 |

| Receive Communication Method and Confirmation | — 612 |

| Generate Communication | — 614 |

| Receive Recipient Acceptance of Gift Card | — 616 |

| Obtain Issued Card and Transmit to Recipient | — 618 |

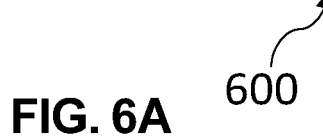

FIG. 6A    600

Present Search Interface — 652

Receive User Input via Search Interface — 654

Analyze User Input to Determine Search Services — 656

Search the Determined/Specified Search Services — 658

Provide Search Results to User — 660

Select One or More Search Results — 662

650

SYSTEMS, METHODS, AND COMPUTER-READABLE MEDIA FOR DYNAMICALLY GENERATED GIFT CARDS

CROSS-REFERENCE TO RELATED APPLICATIONS

This non-provisional patent application claims prior benefit, with regard to all subject matter, of U.S. Provisional Patent Application No. 63/467,108, filed May 17, 2023, and titled "SYSTEMS, METHODS, AND COMPUTER-READABLE MEDIA FOR CUSTOM GIFT CARDS." The identified earlier-filed provisional patent application is hereby incorporated by reference in its entirety.

BACKGROUND

1. Field

Embodiments of the present disclosure generally relate to systems and methods for generating gift cards and, more particularly, to systems and methods for an integrated system for gift card generation, personalization, and rendering based on a selected merchant.

2. Related Art

Typically, consumers purchase gift cards directly from merchants or from a retailer that carries gift cards for various merchants. For a merchant to provide a gift card service for their business, infrastructure is required. For example, the necessary hardware and software to customize and issue a gift card must be provided, licensed, or otherwise obtained by the merchant. Further, retailers will offer gift cards for merchants, where each gift card has its own stock-keeping unit (SKU) that must be preconfigured. As a result, retailers typically are stuck providing a static number of gift cards. Therefore, when a consumer wants to purchase a gift card, they are limited to the gift cards currently offered and cannot obtain gift cards for merchants that do not already have a predefined SKU. Further, due to the resources required to configure SKUs, retailers tend to only offer gift cards for well-known merchants, such as chain retailers. As such, consumers are often limited in the number of businesses they may obtain gift cards for—even more so for small, local businesses. What is needed are improved systems, methods, and computer-readable media for generating personalized gift cards that are usable at user-selected merchants without requiring the merchants to have the infrastructure to support gift card issuance, thereby providing access to a vast number of merchant gift cards. Furthermore, difficulties arise in preventing fraud in gift card purchases. What is needed are improved systems to reduce instances of fraud associated with gift cards.

SUMMARY

In some embodiments, the techniques described herein relate to one or more non-transitory computer-readable media including computer-executable instructions that, when executed by at least one processor, perform a method of dynamically generating gift cards, including: causing display of a graphical user interface for generating a gift card; receiving, from a gifting user and via a search interface in the graphical user interface, a search for one or more merchants for the gift card; determining, based on the search, at least one search service to query for the one or more merchants; retrieving, from the at least one search service and via a first application programming interface (API), merchant information for each of the one or more merchants; causing display of the merchant information for each of the one or more merchants via the graphical user interface; receiving, from the gifting user, a selection of a merchant of the one or more merchants for obtaining the gift card; causing display of a preview of the gift card that includes at least a subset of the merchant information; automatically generating a communication including an affordance actuatable to receive an acceptance of the gift card from a recipient.

In some embodiments, the techniques described herein relate to one or more non-transitory computer-readable media, wherein the graphical user interface is accessible via an application embedded within at least one of a third-party application or a third-party website.

In some embodiments, the techniques described herein relate to one or more non-transitory computer-readable media, wherein the third-party application or the third-party website is associated with the at least one search service.

In some embodiments, the techniques described herein relate to one or more non-transitory computer-readable media, wherein the search includes at least one of a merchant name, a location, or a merchant type.

In some embodiments, the techniques described herein relate to one or more non-transitory computer-readable media, further including: receiving, from the gifting user, an indication of a second search service to query.

In some embodiments, the techniques described herein relate to one or more non-transitory computer-readable media, wherein the method further includes: receiving recipient information from the gifting user; determining, based on the recipient information, one or more suggested merchants of the one or more merchants.

In some embodiments, the techniques described herein relate to one or more non-transitory computer-readable media, wherein the gift card is issued responsive to receiving the acceptance of the gift card.

In some embodiments, the techniques described herein relate to a method of dynamically generating gift cards, the method including: causing display of a graphical user interface for generating a gift card; receiving, from a gifting user and via a search interface in the graphical user interface, a search for one or more merchants for the gift card; retrieving, from one or more search services storing data associated with the one or more merchants, a plurality of information for the one or more merchants; determining, based on the search, at least one search service to query for the one or more merchants; retrieving, from the at least one search service and via a first application programming interface (API), merchant information for each of the one or more merchants; causing display of the merchant information for each of the one or more merchants via the graphical user interface; receiving, from the gifting user, a selection of a merchant of the one or more merchants for obtaining the gift card; causing display of a preview of the gift card that includes at least a subset of the merchant information; automatically generating a communication including an affordance actuatable to receive an acceptance of the gift card from a recipient, wherein the communication is automatically populated to a messaging application on a client device of the gifting user.

In some embodiments, the techniques described herein relate to a method, further including: obtaining pre-approval of the gift card; and upon actuation of the affordance, causing issuance of the gift card, wherein the gift card is prevented from issuance until the actuation is received.

In some embodiments, the techniques described herein relate to a method, wherein retrieving the plurality of information for the one or more merchants is done at predetermined intervals.

In some embodiments, the techniques described herein relate to a method, wherein the method further includes: filtering at least one of the one or more merchants based on known information of the recipient.

In some embodiments, the techniques described herein relate to a method, providing access to the graphical user interface via an application programming interface embedded within a third-party application or a third-party website.

In some embodiments, the techniques described herein relate to a method, wherein the method further includes: determining a restriction for the gift card; and causing issuance of the gift card based on the restriction.

In some embodiments, the techniques described herein relate to a method, wherein the method further includes: wherein the restriction for the gift card is adjustable after issuance.

In some embodiments, the techniques described herein relate to a system for dynamically generating personalized gift cards, the system including: a graphical user interface for receiving a search for a merchant from a gift user; an application programming interface (API) configured to query one or more search services based on the search; and one or more non-transitory computer-readable media including computer-executable instructions that, when executed by at least one processor, cause the system to carry out actions, including: responsive to receiving the search for the merchant, querying the one or more search services using the API; obtaining merchant information for a plurality of merchants from the one or more search services; filtering at least one of the plurality of merchants to obtain a filtered plurality of merchants; causing display of the merchant information for each of the filtered plurality of merchants via the graphical user interface; receiving, from the gifting user, a selection of a merchant of the one or more merchants for obtaining the gift card; causing display of a preview of the gift card that includes at least a subset of the merchant information and; automatically generating a communication including an affordance actuatable to receive an acceptance of the gift card from a recipient.

In some embodiments, the techniques described herein relate to a system, wherein the actions further include: receiving, via the graphical user interface, a second search for the merchant; and re-querying the one or more search services using the API.

In some embodiments, the techniques described herein relate to a system, wherein filtering the at least one of the plurality of merchants is based on a filter received from the user.

In some embodiments, the techniques described herein relate to a system, wherein the actions further include: automatically populating a messaging service on a client device of the user with the communication such that the user can directly transmit the communication to the recipient.

In some embodiments, the techniques described herein relate to a system, wherein the actions further include: receiving, from the gifting user, a second selection of a template for the gift card, wherein the preview is displayed based on the template.

In some embodiments, the techniques described herein relate to a system, determining, based on recipient information, one or more suggested merchants from the one or more merchants for the gift card, the recipient information including social media information associated with the recipient.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 6A illustrates a first exemplary method in accordance with embodiments of the present disclosure.

Figure 1:
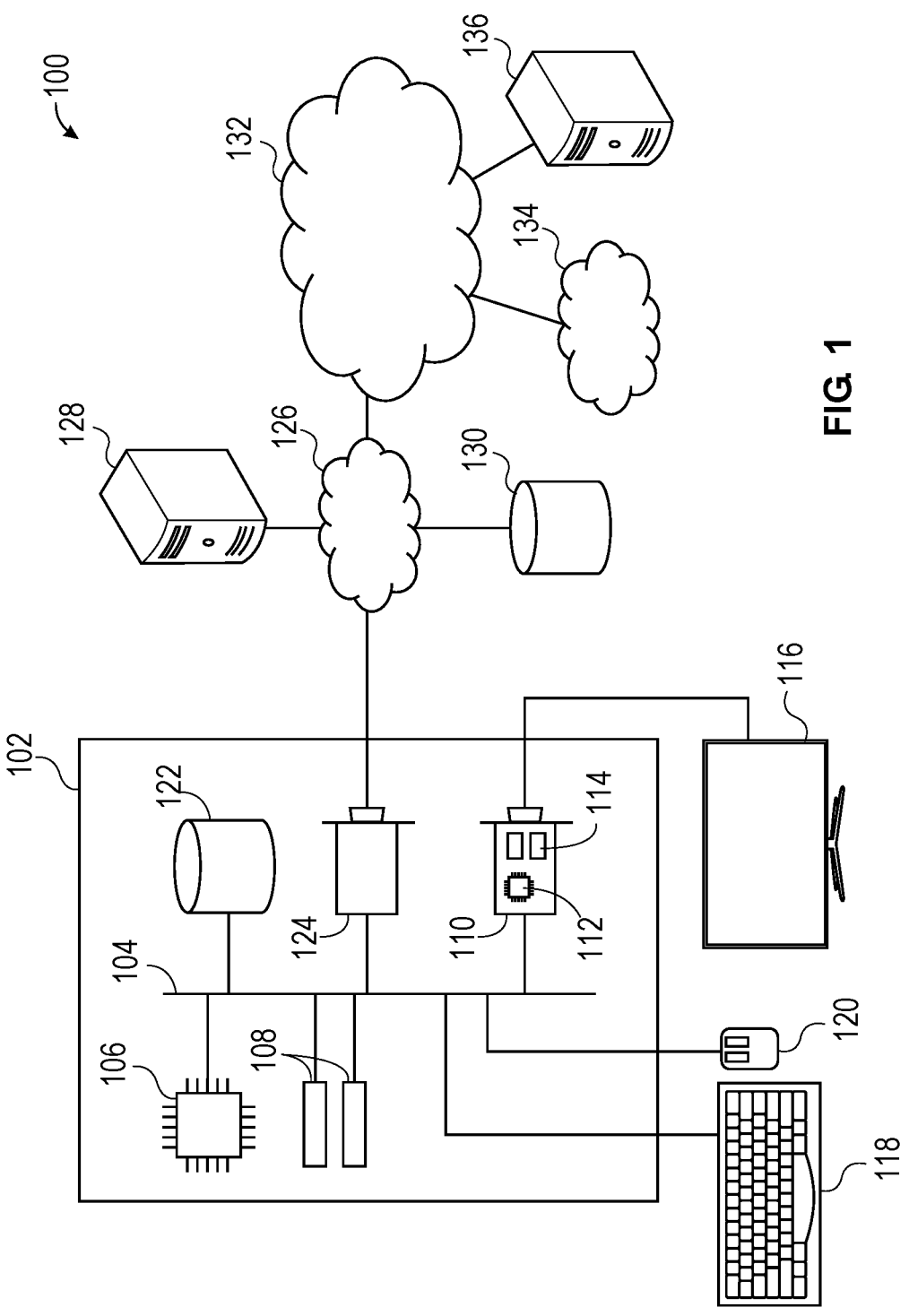
FIG. 1 depicts an exemplary hardware platform in accordance with embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the current disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claims. Terms should not be interpreted as implying any particular ordering of various steps described unless the order of individual steps is explicitly described.

The following detailed description of embodiments of the disclosure references the accompanying drawings that illustrate specific embodiments in which the disclosure can be practiced. The embodiments are intended to describe aspects of the disclosure in sufficient detail to enable those skilled in the art to practice the present disclosure. Other embodiments can be utilized, and changes can be made, without departing from the scope of the disclosure. The following detailed description is, therefore, not to be taken in a limiting sense. The scope of embodiments of the disclosure is defined only by the appended claims, along with the full scope of equivalents to which such claims are entitled.

In this description, references to "one embodiment," "an embodiment," "embodiments," "various embodiments," "certain embodiments," "some embodiments," or "other embodiments" mean that the feature or features being referred to are included in at least one embodiment of the technology. Separate references to "one embodiment", "an embodiment," "embodiments," "various embodiments," "certain embodiments," "some embodiments," or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Operational Environment for Embodiments of the Present Disclosure

Turning first to FIG. 1, an exemplary hardware platform for certain embodiments of the present disclosure is depicted. Computer 102 can be a desktop computer, a laptop computer, a server computer, a mobile device such as a smartphone or tablet, or any other form factor of general- or special-purpose computing device. Depicted with computer 102 are several components for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components that may communicate with each other directly. Connected to system bus 104 is central processing unit (CPU) 106, also referred to herein as a "processor.". Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others, it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Rather, the term "computer-readable media" contemplated non-transitory storage media. Examples of stored information include computer-useable instructions, data structures, program modules, and other data representations. In particular, computer-readable media may store computer-executable instructions that, when executed by CPU 106, perform methods in accordance with embodiments of the present disclosure.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is, in turn, connected to public Internet 132, which connects many networks such as local network 126, remote network 134 or directly attached computers such as computer 136. In some embodiments, computer 102 can itself be directly connected to public Internet 132.

Embodiments of the present disclosure are generally directed to systems, methods, and computer-readable media for dynamically generating gift cards (or other prepaid cards) that are dynamic, curated gift cards based on parameters such as a recipient, a merchant, a merchant category, a location, or the like, or any combination thereof. For example, a user may indicate that they would like to obtain a gift card for a local Thai restaurant within a 30-mile radius of the gift card recipient. In accordance with embodiments described herein, the user indication may be used to search one or more external search services (e.g., via API calls to an exposed endpoint) to retrieve data about merchants meeting the search criteria, and these results may be presented to the user for electing a merchant to obtain a gift card for.

In some embodiments, the gift card is limited to use at a specific merchant, group of merchants, or to one or more merchant categories (e.g., as defined by the Merchant Category Codes (MCCs)). A gifting user may interface with a graphical user interface (GUI) to customize the gift card. The parameters (including a monetary value) may be sent to a gift card engine configured to obtain the gift card. The gift card engine may be embedded within a separate application, website, or the like, such as a merchant review social media application. The gift card engine may interface with one or more white label services or search services to retrieve data to populate a rendering of the gift card. For example, the search service may provide an API allowing the gift card engine to retrieve stored imagery for a local merchant that may be rendered for display on the gift card. Interfacing with search services allows for larger amounts of data and merchants (e.g., in the range of about 5 million merchants or greater) to be used for generating customized gift cards than in previous systems. It is contemplated that data from about 2 to about 5 million merchants may be retrieved from the search services, with custom gift cards able to be generated for each of the merchants. Thus, in contrast to the relatively static gift card SKUs described above, embodiments of the present disclosure enable "ad hoc SKU creation" for gift cards by real-time data retrieval from search services along with limiting the card use using MCCs. The gift card engine may employ one or more databases for retrieving, storing, and filtering data from one or more search services. The database may be filtered to remove merchants below a certain rating threshold, to remove merchants that are part of a chain, or the like, prior to being searched by the gifting user.

The gift card engine may also interface with one or more financial institutions and one or more communication services. The financial institution may be configured to issue the gift card and load the gift card with the amount requested by the gifting user and impose any restrictions on the use of the gift card. The communication service may transmit a communication to the receiving user. The communication may comprise an actuatable link for the receiving user to accept the gift card. Once accepted, the gift card may be issued by the financial institution. The gift card may be prevented from issuing until acknowledgement of receipt by the receiving user (e.g., via actuating the actuatable link), which may aid in fraud reduction by requiring acknowledgement before issuance. Furthermore, the communication may be generated for the gifting user to personally send to the receiving user, which may improve redemption rates of the gift card because the receiving user receives the gift card from a known contact instead of from an automated system.

Additionally, embodiments of the present disclosure provide one or more technical solutions to the technical problems discussed above. For example, embodiments disclosed herein may reduce the amount of electronic communication required between various parties for generating a gift card. For example, where prior systems required communication between a merchant, a financial institution, and a graphics vendor to produce a custom-branded gift card loaded with a value, embodiments of the present disclosure may eliminate the need for electronic communications therebetween by eliminating the need for the merchant and the graphics vendor to participate in the gift card process. Furthermore, embodiments of the present disclosure may reduce and/or eliminate the need for additional hardware and/or software that would be required for merchants to implement a gift card service. Improvements in fraud prevention for gifting gift cards are also disclosed herein.

Exemplary System Architectures

Figure 2A:
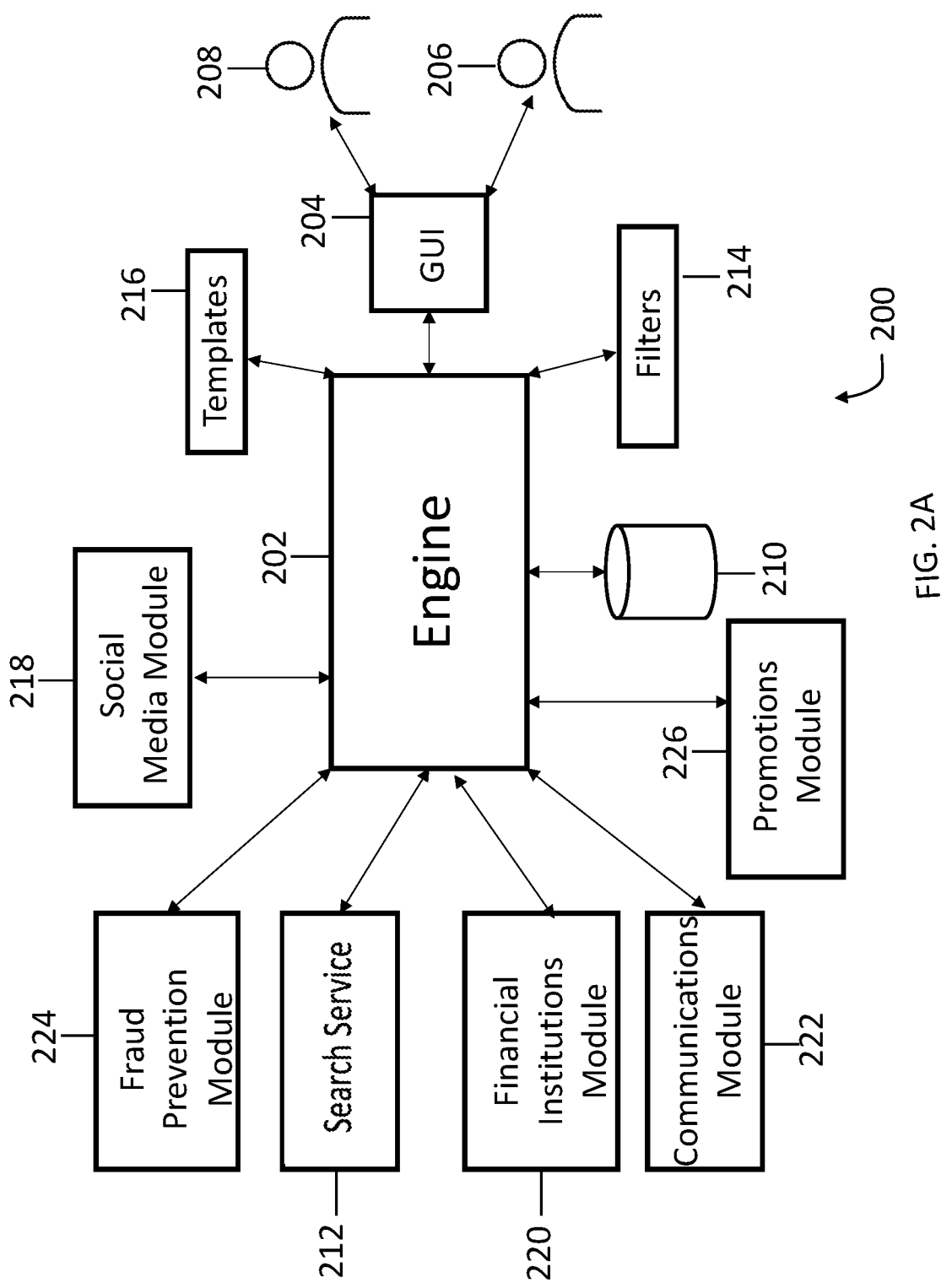
FIG. 2A illustrates an exemplary system in accordance with embodiments of the present disclosure.

FIG. 2A illustrates an architecture for a system 200 for carrying out embodiments of the present disclosure. System 200 may comprise a gift card engine 202 that is connected to various systems, modules, APIs, databases, etc., for creating a gift card, rendering the gift card based on various parameters, and transmitting the gift card to a recipient. In some embodiments, gift card engine 202 provides a GUI 204 via which a gifting user 206 may customize and obtain the gift card. For example, gift card engine 202 may comprise an associated mobile application, and GUI 204 may be provided in the mobile application. As another example, gift card engine 202 may be a web-based application. In some embodiments, gift card engine 202 is implemented as an application that may be embedded within a third-party application. Selection of the embedded application by a user using the third-party application may initiate the gift card process. For example, gift card engine 202 may be embedded in a retailer's website such that it appears to be a part of the retailer's website. For another example, gift card engine 202 may be embedded into a stored value issuing and processing application such that a user can select whether to purchase a pre-existing gift card or utilize gift card engine 202 to generate a gift card. In some embodiments, gift card engine 202 is part of a software development kit (SDK). The gifting user 206 may transmit the gift card to a recipient user 208, who may also utilize GUI 204 (e.g., to view and/or use the received gift card). Exemplary GUI screens are discussed with respect to FIGS. 4A-5C.

As discussed further below, via GUI 204, gifting user 206 may input various parameters for dynamically creating a gift card to gift to recipient user 208. In some embodiments, the parameters comprise information about recipient user 208 and the selected merchant or merchant categories. Recipient user 208 may refer to a singular recipient or to a plurality of recipients. To select a merchant and/or merchant category for the gift card at which the gift card may be used, gift card engine 202 may dynamically retrieve merchant information directly from a search service, such as search service 212. In such embodiments, information is not stored in a database, such as database 210 discussed below. For example, upon receiving a query from a user, gift card engine 202 may request information directly from search service 212 through API calls instead of from database 210. Generally, the search service 212 provides a social interaction API for retrieving merchant information.

In some embodiments, to select a merchant and/or merchant category for the gift card at which the gift card may be used, gift card engine 202 comprises one or more databases, such as database 210, that are searchable by the gifting user 206. At a high level, database 210 stores information about a plurality of merchants and/or merchant categories. The information stored by database 210 may include any information now known or later developed that is relevant to merchants, including, but not limited to, name, address, pricing, category, rating, menu, business type, and the like. In some embodiments, the database 210 stores information obtained from one or more search services 212. For example, the search service 212 may be a social media website on which users post reviews and images of various merchants (e.g., YELP, GOOGLE, etc.). In this example, the reviews and images may be retrieved by gift card engine 202 from search service 212 for storing in database 210. In some embodiments, the information is dynamically rendered or retrieved from the search services 212 into the database 210, and then may be further processed before providing results to the user. For example, the search service 212 may be searched for data based on a query provided by the gifting user 206. Once the matching data is retrieved, database 210 may filter or otherwise process the data. For example, as discussed above, it may be desired to only provide gift cards for local merchants, and national retailers that meet the search criteria may be filtered. Similarly, merchants below a threshold rating or otherwise not meeting a certain criteria (which may be indicated by the gifting user 206 or otherwise predefined by system 200) may be filtered before search results are presented to the gifting user 206 for selecting a merchant to obtain a gift card for. Filtering the search results is discussed further below.

In some embodiments, the information in database 210 may be dynamically stored and updated at a predetermined time interval. By updating database 210, gift card engine 202 allows users to receive the most accurate and relevant information on businesses, including information on newly opened businesses. For example, database 210 may be updated daily, meaning information is pulled from search service 212 daily. In some embodiments, information about a particular merchant and/or merchant category is stored in database 210 only upon the issuance of a gift card for that merchant and/or merchant category. For example, information regarding Bob's Bakery may only be stored in database 210 upon issuance of a gift card for Bob's Bakery issued by financial institutions module 220.

Database 210 may be configured to retrieve data responsive to receiving search input from gifting user 206. In some embodiments, the database 210 stores data from multiple distinct search services 212. This proves advantageous, as it may allow for a user to query a more robust set of merchant information. In some embodiments, based on gifting user 206 accessing gift card engine 202 from a specific search service 212, gift card engine 202 may pull from the data associated with a search service 212 when gifting user 206 searches database 210. For example, gift card engine 202 may be provided as an API embedded into a search service 212. Accordingly, gift card engine 202 may know to search, from the data of multiple search services 212 stored in database 210, a specific search service 212 based on the gifting user 206 accessing the gift card engine 202 from that search service 212. In some embodiments, gift card engine 202 is implemented via a dedicated application, and may receive, from gifting user 206, an indication of one or more search services 212 to search. In some embodiments, gift card engine 202 may determine one or more search services 212 to search based on search criteria and/or any filters input by gifting user 206. For example, a first search service 212 may be for restaurant reviews, and a second search service 212 may be for a wedding planning service. Accordingly, if gifting user 206 provides a search indicative of wedding-related services, gift card engine 202 may search database 210 for data from the second search service 212 based on the search without gifting user 206 having to specify the specific search service 212. In some embodiments, database 210 provides results from multiple search services 212, and gifting user 206 may then select a result from a specific search service 212.

In some embodiments, gifting user 206 selects one or more of filters 214 to database 210 to select or narrow the list of merchants and/or merchant categories at which the gift card can be used. For example, the filters 214 may be used to narrow a search to Mexican restaurants with a 4 star or greater rating with greater than 100 reviews and within a 30-mile radius of the location of recipient user 208. In some embodiments, database 210 filters the data from search service 212 before presenting the data to gifting user 206 for searching. For example, database 210 may filter merchants below a three-star rating, merchants outside a radius of recipient user 208, and the like. Similarly, if gift card engine 202 is accessed from a search service 212, database 210 may automatically filter data from other search services 212. In some embodiments, search service 212 filters the data presented to gifting user 206 for selection.

Upon receiving the filters 214 and retrieving the query results from the search service 212, gift card engine 202 may display the results to the gifting user 206 via GUI 204. In some embodiments, gift card engine 202 is configured to analyze the results and provide one or more suggestions therefrom to gifting user 206. For example, gift card engine 202 may recommend a new restaurant that has recently been receiving rave reviews. In some embodiments, the results are sortable, such as by highest rating, most reviews, menu price, and the like. In some embodiments, suggested merchants and/or merchant categories may be presented to gifting user 206 before gifting user 206 inputs filters 214 and/or a search. The suggested merchants may be based on gifting user 206, recipient user 208, the merchant, a common location between recipient user 208 and the merchant, or the like.

Once the gifting user 206 selects a specific merchant (or merchant category), gift card engine 202 may retrieve data specific to the merchant, which may be used to populate the gift card. For example, the gifting user 206 may select a local coffee shop for the gift card. Gift card engine 202 may then query database 210 and/or search service 212 to pull imagery, ratings, the coffee shop name, and the like to display on the gift card. For example, users of the search service 212 may upload images of the coffee shop to search service 212 (e.g., as part of a review written by the user), which may be retrieved by gift card engine 202. Other information, such as an address of the merchant, a link to the menu, or any other information stored by search service 212, may be retrieved by gift card engine 202 for populating on the gift card. The information may be retrieved and stored in database 210 as described above and/or retrieved on request from search service 212. In some embodiments, the gifting user 206 selects a merchant from data retrieved from a first search service 212, and gift card engine 202 is configured to search one or more other search services 212 to pull imagery, ratings, menus, etc. about the selected merchant to add to the custom gift card.

Figure 3:
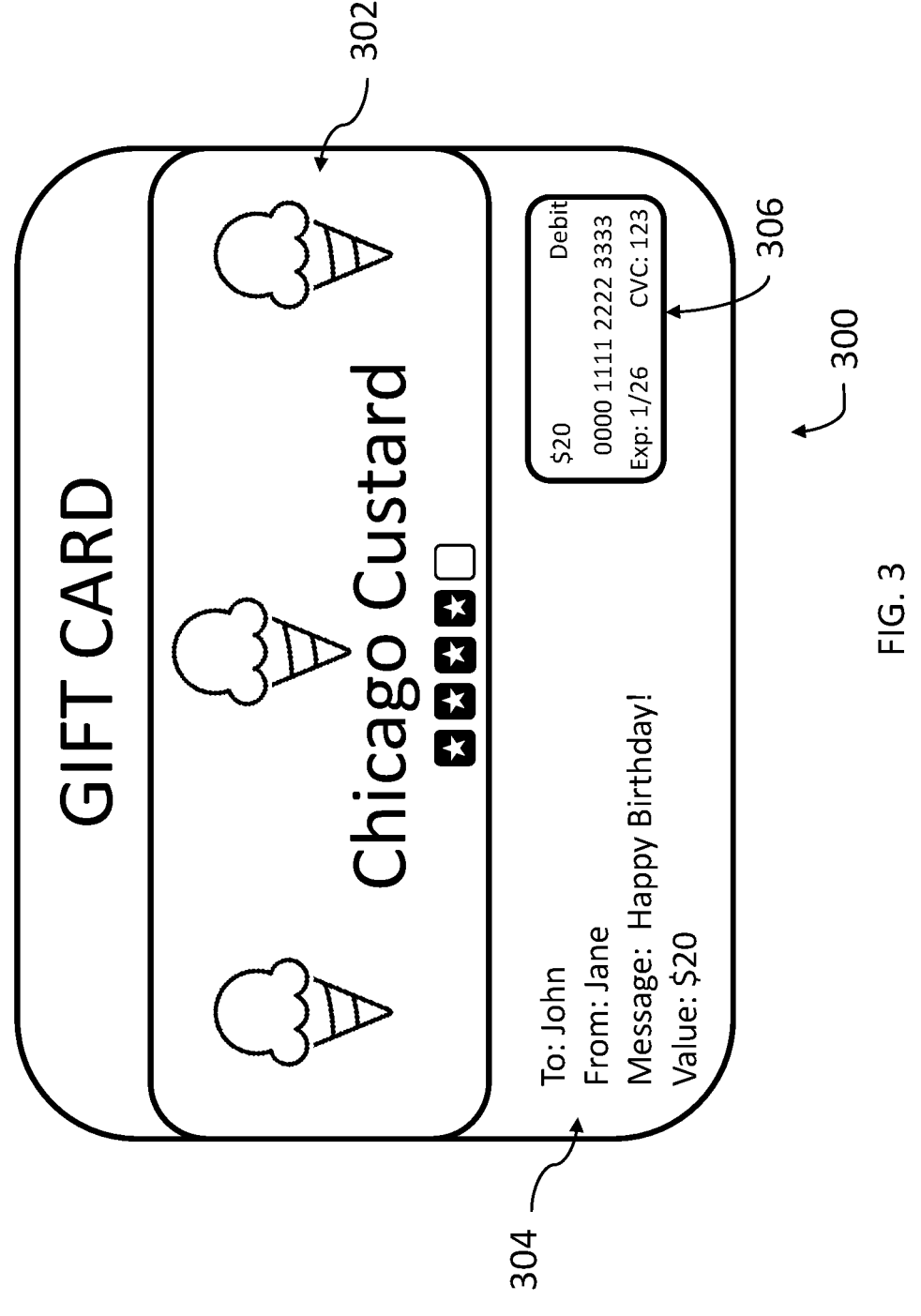
FIG. 3 illustrates an exemplary gift card for some embodiments of the present disclosure.

In some embodiments, gift card engine 202 provides one or more templates 216 to be selected by gifting user 206 that define a layout of the gift card (see FIG. 3). Templates 216 may be pre-defined, user configurable, or both. Thus, gifting user 206 may customize the display of the gift card. For example, different templates 216 may have different layouts of various user interface elements thereon. As another example, a first template 216 may display two images of the merchant retrieved from search service 212, while a second template 216 may display no imagery of the merchant and instead may include a link to the merchant's website and a link to obtain directions to the merchant. Accordingly, gifting user 206 may edit template 216 to achieve a desired layout, appearance, and the like. In some embodiments, template 216 is dynamic such that the display of the gift card may change over time, e.g., as more information about the merchant is received by gift card engine 202. For example, if a new photo of the merchant's restaurant is uploaded to search service 212 and then received by gift card engine 202, that photo may then be available for display on template 216. As another example, the recipient user 208 may use the gift card and take a photo while at the associated merchant, which may be automatically to the rendering of the gift card based on the template 216. For example, using location from the recipient user's smartphone and/or by monitoring the use of the gift card, it may be determined that a photo taken by the recipient user was taken at the merchant, and the photo may be included on the rendering of the gift card. In some embodiments, template 216 may also define a location (e.g., pixel coordinates) on the gift card for rendering personalized information, i.e., information specific to gifting user 206 and/or recipient user 208, and a location for the card information to be rendered. For example, the card number, card value, and an MCC for the card may be displayed.

In some embodiments, machine learning, artificial intelligence, computer vision, or the like may be leveraged to determine which images, media, or other information for a merchant to select for rendering on the gift card. For example, computer vision techniques may be employed to select an optimal image. Images may be selected based on various criteria, such as an image quality, the association of the image with a popular review, the recency of the image, or the like. In some embodiments, images are selected based on the merchant. For example, for a restaurant, gift card engine 202 may select one interior image of the restaurant and one image of a menu item of the restaurant. As another example, if a restaurant merchant category is selected, gift card engine 202 may select images from the highest rated restaurant, most popular restaurant, a restaurant in closest proximity to recipient user 208, or the like. In some embodiments, gifting user 206 may select the image for the merchant and/or merchant category to be displayed.

System 200 may also comprise various modules configured to interface with at least one other component of system 200 and configured to carry out one or more functions for system 200. In some embodiments, system 200 comprises a social media module 218. Social media module 218 may be configured to analyze the social media of gifting user 206, recipient user 208, merchants, or any other user. In some embodiments, the social media activity can be analyzed to provide one or more suggested merchants and/or suggested merchant categories to select for the gift card. In some embodiments, social media module 218 is configured to analyze activity of users of a search service 212. In some embodiments, social media module 218 may be configured to analyze social media for merchants that are trending/popular in order to recommend them to gifting user 206. Providing recommendations based on social media activity is discussed in further detail below.

System 200 may also comprise a financial institutions module 220. Financial institutions module 220 may serve as an API between gift card engine 202 and any number of financial institutions. A financial institution may include any financial service provider now known or later developed including, but not limited to, an issuing financial institution, a program manager with access to an issuing bank, a processor with access to an issuing financial institution, a distributor with access to a financial institution, and similar financial service providers. Gift card engine 202 may interface with the financial institutions module 220 to execute the transaction for the gift card. For example, based on the user input, gift card engine 202 may transmit a request to a financial institution to issue a gift card, and the financial institution may transmit an acceptance of that request. Financial institutions module 220, upon transmitting an acceptance of an issuance request, may deliver a primary account number (PAN) to gift card engine 202. Accordingly, gift card engine 202 may then generate a personalized gift card with a link containing the issued PAN usable at the selected merchant. As such, recipient user 208 may receive the gift card information directly from the issuing financial institution through the link. The gift card may be any entity now known or later developed that is capable of storing value. In some embodiments, the gift card is configured as a preloaded debit card. In some embodiments, the gift card is configured to be non-reloadable.

The gift card may be restricted to one or more merchant category codes (MCCs) as previously discussed. A MCC is a code utilized by payment brands to classify merchants and businesses by the type of goods and/or services provided. For example, rather than gifting user 206 selecting a specific local coffee shop to purchase a gift card for, gifting user 206 may instead purchase a gift card that is usable at all coffee shops. Accordingly, gift card engine 202 may interface with financial institutions module 220 to obtain a gift card that is limited to the MCC covering coffee shops. As such, the gift card may be unusable by recipient user 208 at merchants not covered by the MCC. Using an MCC allows for the gift card to be restricted without relying upon a restricted authorization network (RAN) for restricting cards to a specific merchant. However, embodiments herein may still be used to restrict the gift card to one or more specific merchants, including through the use of a RAN, without departing from the scope hereof. The gift card may be restricted to use at one or more merchants alternatively, or in addition, to being restricted based on the MCC. It is contemplated that a gift card that is restricted to use at a specific merchant may be restricted by analyzing a name of the merchant such as the name of the merchant as shown on a credit card statement or other like transaction, or using a RAN, or by any other method without departing from the scope hereof. It is noted herein that an issued gift card may be unrestricted (e.g., not subject to a particular MCC, etc.), and thus usable at any location accepting gift cards as opposed to businesses within the MCC.

In some embodiments, responsive to gifting user 206 completing an order for the gift card, financial institutions module 220 is configured to pre-approve the gift card. When recipient user 208 accepts the gift card (discussed further below), financial institutions module 220 may be configured to issue the gift card. In some embodiments, gift card engine 202 communicates the restrictions on the card to financial institutions module 220 (e.g., MCC and/or specific merchant that the card is limited) with the request for the card, after pre-approval of the card, or after issuance of the card. Prior to the gift card being issued by financial institutions module 220, the card data may be stored on the servers of financial institutions module 220.

In some embodiments, recipient user 208 may exchange the issued gift card for a specific merchant and/or MCC for another. For example, recipient user 208 may desire to have a gift card for Joe's ice cream shop as opposed to The Big Scoop ice cream shop. Accordingly, upon receiving a request from a user to exchange an issued gift card for a specific merchant, gift card engine 202 may switch the merchant without requiring financial institutions module 220 to issue a new gift card, including a PAN. For example, gift card engine 202 may exchange a gift card by switching the artwork of The Big Scoop with the artwork of Joe's Ice Cream without needing to interface with financial institutions module 220 to invalidate the originally issued PAN and issue a new PAN. In some embodiments, recipient user 208 may be able to exchange the gift card issued by financial institutions module 220 with another gift card to be issued by financial institutions module 220. In some embodiments, the recipient user 208 can interchange the MCC for the gift card without having to obtain a newly issued gift card. For example, the recipient user 208 may change the MCC for a gift card restricted to restaurants to a different MCC that restricts the gift card to clothing merchants. In some embodiments, system 200 communicates with the card issuer through financial institutions module 220 to update the MCC. When the MCC is changed for a gift card, the display of the gift card may be changed based on the new MCC. In some embodiments, the card issuer may issue an entirely new gift card upon request to change the MCC. In some embodiments, a gift card is restricted to exchanges within the same MCC.

In some embodiments, a tokenized transaction is executed between gift card engine 202 and recipient user 208. For example, the acceptance of the gift card may be carried out via a tokenized transaction between recipient user 208 and gift card engine 202. Once gift card engine 202 validates the tokenized transaction, the template 216 for rendering the gift card may be retrieved from financial institutions module 220 and/or determined based on the card issuer. For example, different card issuers may require gift cards to be rendered according to different templates. Thereafter, gift card engine 202 may render the customized gift card based on the template 216 and the merchant-specific data. In some embodiments, each transaction made with the gift card at a merchant is a tokenized transaction.

Gift card engine 202 may also interface with a communications module 222. Communications module 222 may facilitate communications between gift card engine 202, gifting user 206, recipient user 208, a merchant, or any combination thereof. In some embodiments, upon gifting user 206 finalizing the gift card, gift card engine 202 interfaces with communications module 222 to generate a communication to recipient user 208. The communication may comprise a unique link that may be navigated to by recipient user 208 to accept the gift card. For example, communications module 222 may generate a SMS comprising the unique link that is sent to recipient user 208. Once the gift card is accepted by recipient user 208, gift card engine 202 may interface with financial institutions module 220 to issue and transmit the gift card to the user. Generally, any method by which recipient user 208 may accept the gift card is within the scope hereof.

Communications module 222 may interface with a contacts list associated with a gifting user 206, allowing a message to be transmitted directly from gifting user 206 to a user in their contacts list (e.g., recipient user 208). In some embodiments, as depicted in FIG. 4E (discussed below), communications module 222 may auto-populate a message field for gifting user 206, such as a SMS entry field associated with the phone number of gifting user 206 or an email draft associated with an email address of gifting user 206. In such embodiments, the auto-populated message may include means by which recipient user 208 can redeem the gift card generated by gifting user 206. For example, upon creating a personalized gift card, gifting user 206 may then be directed to a text messaging application, where an auto-populated message including a link to the gift card is located in the message entry field Accordingly, gifting user 206 may then send the message (optionally with any edits to the message) directly from the number associated with gifting user 206 such that recipient user 208 receives a message directly from gifting user 206. This proves advantageous, as fraudulent activity may be reduced by gifting user 206 personally transmitting the communication to recipient user 208 such that recipient user 208 receives the gift card from a known sender. Further, recipient user 208 may be more likely to redeem the gift card because they are receiving the communication with the redemption link from a known person and phone number, rather than an automated number, which may avoid the gift card communication being filtered or otherwise missed by the recipient, for example.

System 200 may further include a fraud prevention module 224 configured to monitor for and/or prevent fraud. In some embodiments, fraud prevention module 224 interfaces with communications module 222 and/or financial institutions module 220. For example, fraud prevention module 224 may prevent the issuance of a gift card value until recipient user 208 accesses the link to redeem sent by communications module 222 and is then verified. For another example, fraud prevention module 224 may block access to an issued gift card until the recipient user 208 is verified as the correct recipient. In some embodiments, fraud prevention module 224 utilizes two-factor authentication, a one-time password, and/or any other verification method now known or later developed to ensure the correct recipient user 208 accesses the gift card. For example, upon clicking a link to access a gift card, recipient user 208 may be prompted for additional information (such as a verification code or a one-time password sent to an email associated with recipient user 208) to access the value of the gift card.

In some embodiments, fraud prevention module 224 may monitor for fraudulent merchants. For example, if gifting user 206 attempts to order a gift card for use at a business with historical fraudulent activity, gifting user 206 may be alerted and/or the order may be denied. In some embodiments, fraud prevention module 224 may analyze the MCCs of a gift card for fraudulent activity. For example, if a gifting user 206 attempts to purchase a gift card with an MCC or a merchant that is commonly associated with fraudulent activity, such a purchase may be flagged for risk of fraud. Accordingly, fraud prevention module 224 may interface with financial institutions module 220 to restrict the merchant and/or MCC of a gift card such as to prevent the gift card from being used at merchants commonly associated with fraudulent activity.

In some embodiments, fraud prevention module 224 may monitor the geolocation of gifting user 206, recipient user 208, the merchant, or any combination thereof. In such embodiments, fraud prevention module 224 may compare the geolocation of gifting user 206, recipient user 208, or the merchant to determine if a discrepancy exists. For example, if recipient user 208 and the merchant are in different locations (such as a recipient user 208 in the United States and a merchant located in China), this may be indicative of fraud. Accordingly, fraud prevention module 224 may flag the risk of fraud for gifting user 206 and/or recipient user 208. It will be appreciated that the presence of an online store for the merchant may be accounted for when determining fraud based on geolocation.

In some embodiments, fraud prevention module 224 comprises or is otherwise associated with a machine learning model trained to detect and/or prevent fraudulent activity. For example, fraud prevention module 224 may utilize previous instances of fraud documented by users and reviews in order to determine when a pattern of activity by a merchant is fraudulent. Fraud prevention module 224 may be configured to take corrective action responsive to detecting fraudulent activity and/or responsive to determining likely fraudulent activity.

In some embodiments, system 200 further comprises a promotions module 226. In some embodiments, promotions module 226 is configured to handle various promotions for gift card engine 202. For example, a merchant may wish to provide discounts for shoppers buying gift cards, such as a "buy $40 in gift cards and receive a free $10 gift card" promotion. Such communication between the merchant and gift card engine 202 may be handled by way of promotions module 226. As another example, a convenience fee for issuing a gift card (or other prepaid card) is often charged by the issuer (e.g., in the range of about 8-10% of the value of the card). This cost is generally passed onto the purchaser such that the purchaser is charged a value greater than the worth of the prepaid card. Accordingly, it is contemplated that a merchant may interface with promotions module 226 to take on the convenience fee cost such that the purchaser no longer has to pay the cost.

Figure 2B:
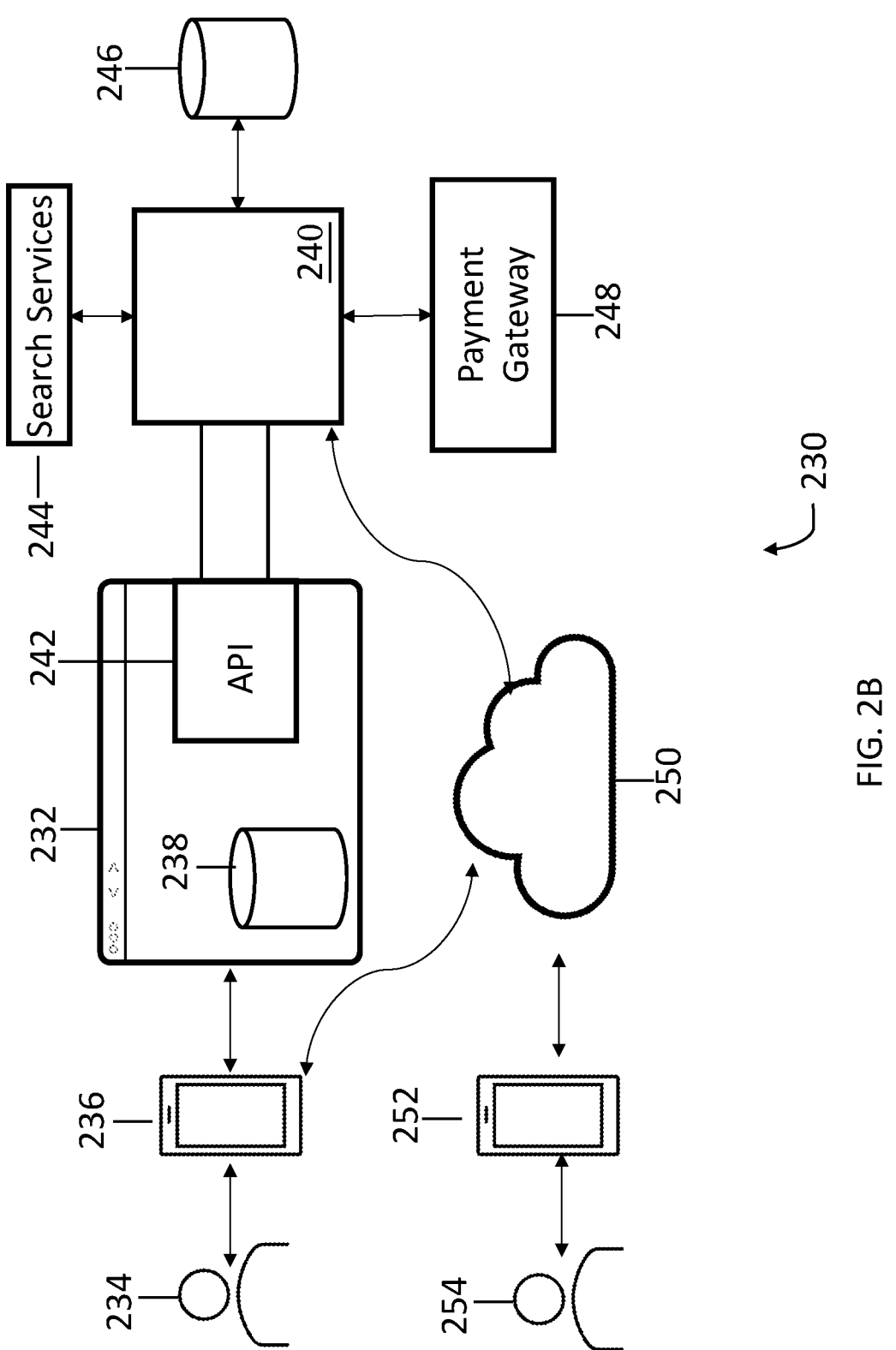
FIG. 2B illustrates an exemplary system in accordance with embodiments of the present disclosure.

FIG. 2B illustrates an architecture for a system 230 for carrying out embodiments of the present disclosure. System 230 may be substantially similar to system 200, and it will be appreciated that components of system 200 may be included in system 230 and vice versa without departing from the scope hereof. Generally, system 230 may include a white label service 232 accessible by a gifting user 234 (corresponding to gifting user 206) via gifting user client device 236. As previously discussed, white label service 232 may store/provide static gift card SKUs 238 by which consumers can obtain preconfigured gift cards. However, if a gifting user 234 wishes to obtain a gift card for a merchant that does not have a preconfigured SKU, gifting user 234 may access engine 240 (corresponding to system 200), which may be accessible via an API 242 embedded in white label service 232 or via another method. For example, it is common for white label services 232 to contract gift card purchasing to a third party such that users are directed to the third-party service for obtaining a gift card. Accordingly, API 242 may likewise be embedded within the third-party service to provide the gifting user 234 with access to the engine 240. As discussed, engine 240 may be an embedded application such that gifting user can obtain a dynamic gift card via engine 240 without having to navigate away from white label service 232.

Engine 240 may be connected to search services 244 (corresponding to search service 212), templates 246 (corresponding to 216), and payment gateway 248 (corresponding to financial institutions module 220). Engine 240 may retrieve data from search services 244 based on input from gifting user 234 as previously discussed. Templates 246 may include a repository of templates selectable and/or configurable by gifting user 234 to define a layout of the rendering of the gift card. Payment gateway 248 may handle issuance of the gift card.

Engine 240 may further be connected to network 250. Network 250 may also connect to gifting user client device 236, along with recipient user client device 252 operated by recipient user 254 (corresponding to recipient user 208). Recipient user 254 may refer to a singular recipient or a plurality of recipients, and recipient user client device 252 may refer to a singular device or a plurality of devices. As previously discussed with respect to communications module 222, messages may be transmitted from gifting user 234 to recipient user 254 that include a link or the like for the recipient user 254 to accept the gift card. These messages may be communicated via network 250. Engine 240 may interface with a messaging application on gifting user client device 236 such that engine 240 can compose and populate a message entry field in the messaging application that includes a message with the link. This message may then be transmitted by the gifting user 234 directly to the recipient user 254.

Exemplary Custom Gift Card

FIG. 3 illustrates an exemplary gift card 300 that may be generated by system 200 for gifting to recipient user 208 for some embodiments of the present disclosure. In some embodiments, exemplary gift card 300 is a digital gift card, which may be added to a digital wallet and/or a camera roll on a smartphone of recipient user 208. In some embodiments, gift card engine 202 is configured to obtain a physical gift card. For example, gift card engine 202 may instruct financial institutions module 220 to produce a physical gift card based on the layout of gift card 300 selected by gifting user 206 and send the physical gift card to a specified location (e.g., to the gifting user 206 or recipient user 208). In some embodiments, exemplary gift card 300 is presented to recipient user 208 in a printable format which may be printed and then redeemed by recipient user 208.

As shown, gift card 300 may comprise various user interface elements configured to display various data (e.g., imagery, text data, video data, etc.). The user interface elements may be rendered on gift card 300 based on a template 216 as previously discussed. In some embodiments, the gifting user 206 can create a custom template 216 and/or customize a pre-existing template 216. In some embodiments, the template 216 is provided by the card issuer. Generally, the gift card 300 may include any information related to the transaction including, but not limited to, merchant information, merchant category, personalized information for recipient user 208, merchant branding, issuing financial institution information, white label searching service information, and the like.

In some embodiments, exemplary gift card 300 comprises a merchant region 302. The merchant region 302 may display information about the selected merchant (or merchant category) for the gift card 300. For example, as illustrated, merchant region 302 displays the merchant's name (Chicago Custard), images of the merchant (the ice cream cones), and a rating of the merchant. The information displayed in merchant region 302 may be retrieved from search service 212, as previously discussed. Other information that may be included in merchant region 302 includes a menu (or link thereto), a link to a website of the merchant, a link to a third-party reservation system to make a reservation at the merchant, a link to obtain directions to the merchant (e.g., a link that opens a map application on the smartphone of recipient user 208 with the directions), a link to social media profiles of the merchant, and the like. In some embodiments, the information in merchant region 302 is dynamic and may change over time. For example, merchant region 302 may display the latest image posted by the merchant on an image hosting site (e.g., INSTAGRAM) that updates when the merchant adds a new post. While displayed in a single region, it will be appreciated that the information for the merchant can be displayed in any region(s) of exemplary gift card 300. In some embodiments, if recipient user 208 interchanges the MCC or merchant for gift card 300, the information displayed in merchant region 302 may change in order to include information associated with the new merchant and/or MCC, such as the artwork associated with the new merchant and/or MCC. For example, if recipient user 208 interchanges "One Big Scoop" for "Chicago Custard", merchant region 302 may then include the name "One Big Scoop", as well as its rating, website link, branding, and the like.

Gift card 300 may also comprise personalization region 304. Personalization region 304 may display information specific to recipient user 208. For example, as shown, personalization region 304 displays the name of recipient user 208, the name of gifting user 206, a personalized message, the value of the card, or any combination thereof. Various other information may be added to personalization region 304 as will be appreciated by one of skill in the art. For example, in some embodiments, an image may be displayed in personalization region 304, such as an image of gifting user 206 and recipient user 208. The gifting user 206 may upload any imagery or other personalization information to gift card engine 202, which may be stored in one or more databases associated with gift card engine 202. As another example, an animation may be added to personalization region 304. For example, animated text of "Happy Birthday" may be displayed and the text animation may play whenever recipient user 208 views the gift card 300.

Gift card 300 may also comprise card details region 306. Card details region 306 may display the information for the gift card. For example, the gift card value (which may be updated as recipient user 208 uses the gift card) may be displayed. The type of card (e.g., credit or debit) as well as the issuing financial institution may also be displayed. In some embodiments, card details region 306 displays the MCC(s) and/or categories applicable to the gift card 300. Card details region 306 may also display the card number, expiration date, the security number (e.g., CVC/CVV) for the exemplary gift card 300, or any combination thereof.

Exemplary Application User Interfaces and Application Flow

FIGS. 4A-4F illustrate exemplary user interfaces that may be presented to a user (e.g., gifting user 206 and/or recipient user 208) during purchase and/or use of the gift card 300. The below-described user interfaces may correspond to GUI 204 discussed above.

Figures 4A, 4B:
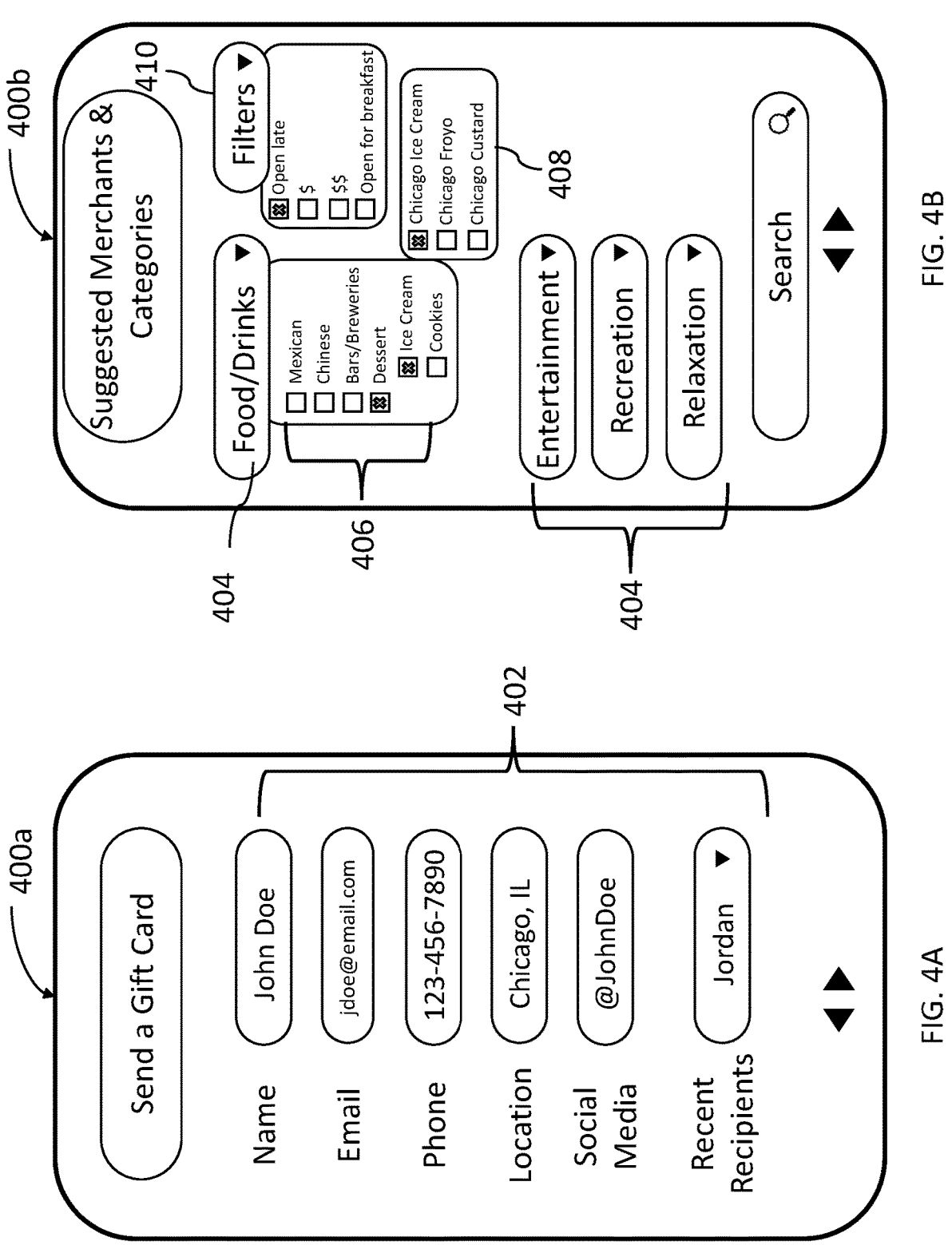
FIG. 4A illustrates a first user interface for some embodiments of the present disclosure.
FIG. 4B illustrates a second user interface for some embodiments of the present disclosure.

FIG. 4A illustrates a first user interface 400a for some embodiments of the present disclosure. First user interface 400a may be displayed to gifting user 206 as a first page when the gifting user 206 goes through the flow of ordering and customizing a gift card 300 in accordance with embodiments of the present disclosure.

In some embodiments, first user interface 400a is operable to receive various information about recipient user 208 of the gift card 300. As shown, first user interface 400a may display a plurality of input fields 402 operable to accept user input from the gifting user 206. The input fields 402 may accept text input and/or may be configured as search fields allowing the gifting user 206 to search stored information. Other input types may also be received. In some embodiments, input fields 402 comprises a name field, an email field, a phone field, a location field, a social media field, a recent recipients field, or any combination thereof. Generally, any information about the recipient user 208 may be received in first user interface 400a. For example, known likes and/or dislikes of the recipient user 208 may be received and used by gift card engine 202 to suggest merchants and/or filter merchants from being presented to gifting user 206.

The name field may be configured to receive the name of recipient user 208. The email field may be configured to receive an email address for recipient user 208. In some embodiments, the email of recipient user 208 may be used to provide location-based recommendations. For example, if recipient user 208 is a college student having a .edu email, the location of the college associated with the .edu email may be used to provide recommendations. The phone field may be configured to receive a phone number for recipient user 208. Similar to the email, the area code for the phone number of recipient user 208 may be leveraged to determine a location of recipient user 208 and provide recommendations based on the location. The recent recipients field may allow the gifting user 206 to search past recipients that the gifting user 206 has previously sent gift card 300 (or has previously inputted information for in input fields 402 even if gifting user 206 did not complete the ordering process for the gift card 300).

The location input field 402 may receive a location of recipient user 208. The location may be used by gift card engine 202 to determine suggested merchants for the gift card 300. For example, gift card engine 202 may limit searching search service 212 for merchants that are in or near Chicago, IL based on the input in the location input field 402. The location may also be used to specify a location to deliver a physically-issued gift card, as described above. In some embodiments, gifting user 206 can define a maximum geographic range that limits the search of database 210. For example, gift card engine 202 may exclude all business located outside of a 50-mile radius of the inputted location. It will be appreciated that the location input field 402 is not limited to a home location of recipient user 208. For example, the gifting user 206 may wish to send recipient user 208 gift card 300 for use while recipient user 208 is on vacation and, accordingly, may input the vacation location in the location input field 402.

Gifting user 206 may also input one or more social media profiles for recipient user 208 in social media input field 402. As described above, system 200 may comprise a social media module 218 operable to analyze the social media history of recipient user 208. For example, posts, reviews, images, likes, and other social media activity of recipient user 208 on various social media platforms may be analyzed to determine suggested merchants for recipient user 208. For example, on a restaurant review website, recipient user 208 may have given ten breweries four-star ratings, and ten wineries two-star ratings. Accordingly, gift card engine 202 may provide local breweries as suggestions to gifting user 206 and may not provide local wineries as suggested merchants. As another example, the social media history of recipient user 208 may comprise a post stating "I love third wave coffee shops!" gift card engine 202 may accordingly recommend local third wave coffee shops to gifting user 206. As yet another example, the social media history may indicate that recipient user 208 is an avid movie goer and, gift card engine 202 may suggest gifting user 206 to purchase gift card 300 for the MCC corresponding to movie theaters. Generally, gift card engine 202 may connect to any social media service and may connect to an API provided by the service to retrieve and analyze social media data for generating recommendations.

Turning now to FIG. 4B, a second user interface 400b is illustrated for some embodiments. Second user interface 400b may be presented to gifting user 206 after the information of recipient user 208 is received via first user interface 400a. In some embodiments, second user interface 400b comprises suggested merchants and/or merchant categories that the gifting user 206 may select from for gift card 300. The suggested merchants/merchant categories may be determined based, in part, on recipient user 208 as previously discussed.

In some embodiments, second user interface 400b comprises merchant categories 404. For example, merchant categories 404 may comprise a Food/Drink category, an Entertainment category, a Recreation category, a Relaxation category, or the like. In some embodiments, merchant categories 404 correspond to an MCC category. Each of merchant categories 404 may be presented as a drop-down list, which may present subcategories 406 when selected. For example, as shown, gifting user 206 has selected the food/drink category, and the subcategories 406 include Mexican, Chinese, bars/breweries, and dessert. One of the subcategories 406 may be selected to present further nested subcategories. For example, the dessert subcategory has been selected, which can further be narrowed to ice cream and cookies subcategories. In some embodiments, once a final subcategory has been selected, second user interface 400*b* presents suggested merchants 408 associated with the subcategory. As shown, the suggested merchants 408 comprise Chicago-based ice cream stores based on the category and subcategories selected by the gifting user 206 and the location provided in location input field 402. In some embodiments, gifting user 206 can select a merchant from the list in second user interface 400*b* at which the gift card 300 may be used. In some embodiments, gifting user 206 selects a merchant category (e.g., dessert) from second user interface 400*b*, and gift card engine 202 obtains a gift card 300 with a MCC corresponding to the selected category.

In some embodiments, the second user interface 400*b* further comprises filters 410. Filters 410 may correspond to filters 214 discussed above. In some embodiments, filters 410 allow for gifting user 206 to filter the results provided in second user interface 400*b*. For example, gifting user 206 may filter by business hours (e.g., open late, open early, 24 hrs, open for lunch, etc.). Furthermore, filters for price ranges may be provided and may be mutable by gifting user 206. For example, the gifting user 206 may set custom price ranges and/or may use price brackets provided by gift card engine 202 and/or search service 212. In some embodiments, database 210 filters results before presenting the suggested merchants to gifting user 206. For example, gift card engine 202 may add an additional filter to filter out any chain merchants such that only local merchants are suggested. As another example, gift card engine 202 may automatically filter out any merchant below a threshold rating (e.g., below three stars on a five-star scale). Generally, any method of presenting database 210 results to gifting user 206 and allowing gifting user 206 to select, filter, search, sort, or any combination thereof of the database results is within the scope hereof.

Figures 4C, 4D:
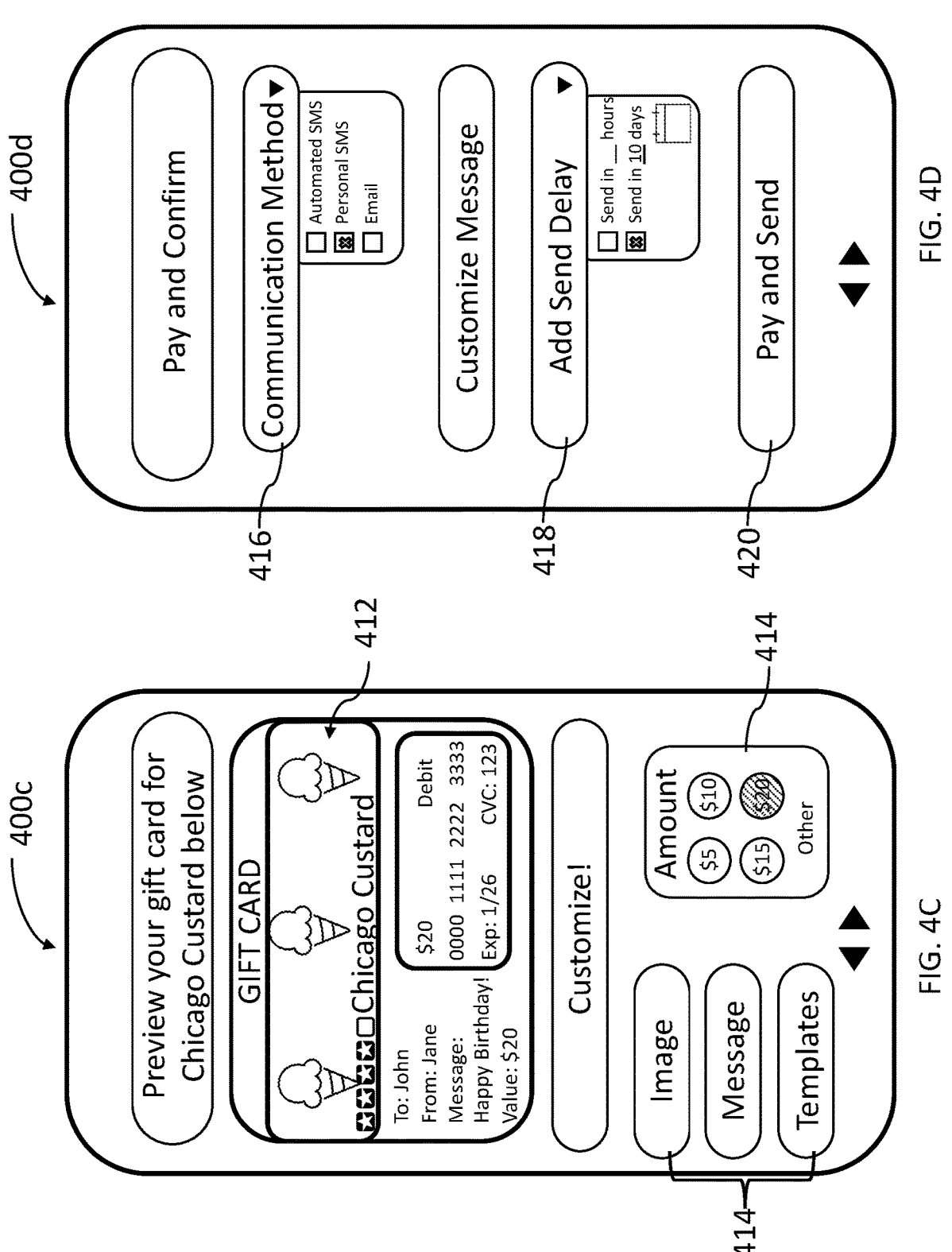
FIG. 4C illustrates a third user interface for some embodiments of the present disclosure.
FIG. 4D illustrates a fourth user interface for some embodiments of the present disclosure.
Figures 4E, 4F:
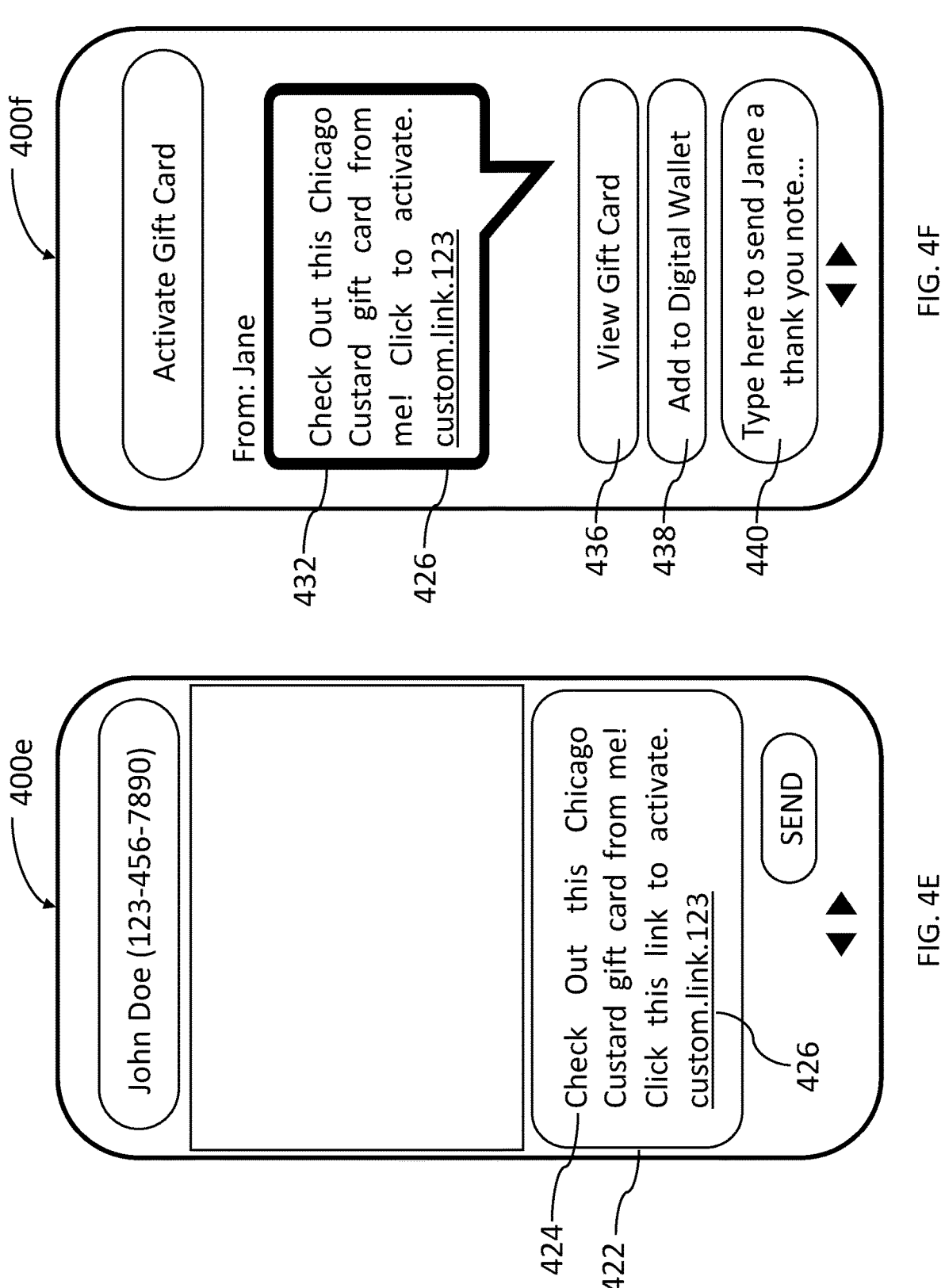
FIG. 4E illustrates a fifth user interface for some embodiments of the present disclosure.
FIG. 4F illustrates a sixth user interface for some embodiments of the present disclosure.

FIG. 4C illustrates a third user interface 400*c* for some embodiments of the present disclosure. Third user interface 400*c* may be presented to gifting user 206 responsive to gifting user 206 selecting the merchant and/or merchant category for the gift card 300. Third user interface 400*c* may comprise a preview of the gift card 300 as rendered based on the selected merchant, recipient user 208 information, and various other information as discussed above with respect to FIG. 3.

The gift card preview 412 may display a preview of how the gift card will look once issued and sent to recipient user 208. Accordingly, gift card preview 412 may update as gifting user 206 changes parameters relating to the gift card. For example, if gifting user 206 navigates back to second user interface 400*b* and selects a new merchant, gift card engine 202 may pull data for that new merchant from search service 212 and populate the retrieved data in gift card preview 412. The gift card preview 412 may be rendered based on template 216. In some embodiments, dummy information (e.g., card number, expiration date, etc.) is used for the card details section in gift card preview 412. As discussed previously, the card information may be stored by the card issuer until recipient user 208 accepts the gift card and the acceptance is verified by financial institutions module 220.

In some embodiments, third user interface 400*c* comprises customization affordances 414 that may be actuated by gifting user 206 to customize the gift card 300. As shown, customization affordances 414 comprises an image affordance, a message affordance, a templates affordance, and an amounts affordance. The image affordance may allow the gifting user 206 to change the image(s) of the merchant displayed on gift card 300. Additionally, other imagery or media on exemplary gift card 300 may be changed via the image affordance (e.g., adding a personalized image in personalization region 304). Likewise, the message affordance may be actuated to add, delete, or otherwise modify a message displayed on gift card 300 or transmitted therewith. The templates affordance may allow the gifting user 206 to change the rendering template for gift card 300. For example, the gift card preview 412 may be rendered based on a first template wherein merchant region 302 is located in an upper region of gift card 300, and personalization region 304 and card details region 306 are located adjacently in a lower region of gift card 300. Accordingly, via the templates affordance, the gifting user 206 may choose to render the gift card 300 based on a template wherein the position of merchant region 302, personalization region 304, and card details region 306 are changed. Similarly, the templates affordance may be actuated to edit and/or create a custom template for gift card 300.

Customization affordances 414 may also comprise an amounts affordance. The amounts affordance may display one or more suggested amounts for the gift card 300. The suggested amounts may be determined based on a variety of factors. For example, the selected merchant and/or merchant category may be analyzed to determine a suggested amount. For example, selecting the bookstores MCC may result in a different suggested amount than if the gift card 300 is for a formalwear retailer. In some embodiments, prior gift card purchases for the merchant and/or merchant category are analyzed. For example, previously purchased gift cards for an ice cream store may indicate that the value for the gift cards is generally in the range of $5-$20. Accordingly, a range of numbers between $5 and $20 may be suggested, as shown. As another example, gift card engine 202 may be configured to analyze other data associated with the merchant. For example, gift card engine 202 may analyze menu or retail prices to suggest amounts. Customization affordances 414 may also comprise an option for gifting user 206 to input a custom monetary amount. As such, gifting user 206 is not restricted to a predefined amount range or to a suggested amount when selecting a gift card amount. Machine learning and/or artificial intelligence techniques may be used to learn suggested prices based on merchants, past gift card orders, menus/shop prices, and the like.

Turning to FIG. 4D, a fourth user interface 400*d* is illustrated for some embodiments of the present disclosure. Fourth user interface 400*d* may provide for gifting user 206 to confirm payment and select a communications method for sending the gift card 300 to recipient user 208. As previously discussed, recipient user 208 may be sent a communication comprising a unique link or other acceptance method that may require interaction by recipient user 208 to accept the gift card 300. Responsive to receiving the acceptance, gift card engine 202 may interface with financial institutions module 220 to obtain and issue the gift card 300 loaded with the value provided by gifting user 206 and restricted to one or more MCCs, one or more merchants, or any combination thereof.

Fourth user interface 400d may comprise a communications affordance 416 for selecting the communication method. In some embodiments, communications affordance 416 is implemented as a drop-down menu; however, generally any method for allowing gifting user 206 to select a communications method is within the scope of embodiments hereof. In some embodiments, the communications method is at least one of: an SMS communication, an email message, a message sent through a mobile application, an automated phone call, or the like. In some embodiments, the communication includes a printable version of the gift card 300 or provides access (e.g., via a unique link) to a printable version of the gift card 300. Fourth user interface 400d may also comprise a customize message affordance that may allow gifting user 206 to customize the message transmitted to recipient user 208. In some embodiments, the communications message is an automated SMS or email transmitted by a server associated with system 200 to the phone number or email of recipient user 208.

In some embodiments, the communications message comprises a message sent directly from gifting user 206 to recipient user 208. For example, gift card engine 202 may be configured to create a SMS for gifting user 206 that originates from the phone of the gifting user 206 and is sent to the gifting user 206. The SMS may comprise the unique link for activating the gift card 300 as discussed above. By generating an SMS that is sent by gifting user 206, instances of fraud may be reduced because recipient user 208 receives a message from a known phone number (i.e., the phone number of gifting user 206). Likewise, gift card engine 202 may be configured to generate an email that gifting user 206 can send from a personal email to the email of recipient user 208, which may also reduce fraud and the likelihood that the email message is sent to a spam folder and potentially not seen by recipient user 208.

In some embodiments, fourth user interface 400d comprises a send delay affordance 418. The send delay affordance 418 may allow the gifting user 206 to schedule the sending of the communication to recipient user 208. For example, if gifting user 206 is purchasing a gift card 300 for the recipient user's birthday that is in ten days, the gifting user 206 may delay the sending of gift card 300 to send ten days after purchasing. Send delay affordance 418 may comprise options to send the gift card 300 in X hours, in X days, may provide a calendar option to select and/or input a specific date to send the communication, or the like.

Fourth user interface 400d may further comprise a confirmation affordance 420. The confirmation affordance 420 may be actuated to confirm the sending of the gift card 300 and may direct gifting user 206 to provide payment information therefor. In some embodiments, the payment information is received prior to selection of the communication.

Turning now to FIG. 4E, a fifth user interface 400e is illustrated for some embodiments of the present disclosure. Fifth user interface 400e may be presented to gifting user 206 for manually sending gift card 300 to recipient user 208 from a phone number and/or email associated with gifting user 206, as discussed above. Fifth user interface 400e comprises a text box 424 with an auto generated message 422. The message 422 may include an access link 426 for recipient user 208 to click for access to the gift card. Thus, recipient user 208 receives the gift card 300 directly from a known contact.

By providing for gifting user 206 to directly transmit the gift card 300 to recipient user 208, instances of fraud may be reduced because gifting user 206 receives the gift card 300 directly from a known contact. Furthermore, gift card redemption rates may be improved. As previously discussed, digital gift cards are typically transmitted to a recipient using an automated messaging service (e.g., email or SMS). These automated messaging services often have email domains or phone numbers that are filtered by the respective messaging service. Thus, while the gift card 300 is sent to the recipient user 208, the recipient user 208 may never actually realize the gift card 300 was sent because the message containing the gift card was filtered. Furthermore, digital gift card services that transmit gift cards using such automated methods will often send follow-up communications to the recipient when the gift card has not been accessed and/or activated after an amount of time. However, these follow-up communications are similarly automatic and will be sent via the same communications method as the original message (e.g., have the same email domain) such that the follow-up messages are likewise filtered by the messaging services. Thus, the redemption rates of gift cards 300 is lowered because recipients may not realize that they have even been gifted a gift card. Accordingly, when recipient user 208 receives gift card 300 directly from the gifting user 206, the likelihood that the gift card 300 is redeemed increases because the likelihood that the recipient user 208 is unaware they have been sent a gift card 300 is reduced or eliminated.

Turning now to FIG. 4F, a sixth user interface 400f is illustrated for some embodiments of the present disclosure. Sixth user interface 400f may be presented to the recipient user 208 for accepting gift card 300. As previously discussed, system 200 may comprise a messaging service which may allow gifting user 206 to transmit a message directly to recipient user 208 within the application. Thus, sixth user interface 400f illustrates an exemplary interface for how such a message may be presented to recipient user 208.

Sixth user interface 400f comprises a message 432 corresponding to message 422. The message 432 includes link 426 that may be actuated by recipient user 208 to activate the gift card 300 as previously discussed. Sixth user interface 400f may also comprise a view gift card affordance 436 that may be actuatable to cause display of the gift card 300 to recipient user 208. Additionally, sixth user interface 400f may comprise an add to wallet affordance 438 for adding the gift card to a digital wallet of recipient user 208. Furthermore, sixth user interface 400f may comprise a text field 440 via which recipient user 208 may transmit a response to the gifting user 206. Interfaces 400e, 400f are representative of messaging interfaces that may be employed within a mobile application, for example; however, as discussed above, systems 200, 230 may integrate with an external messaging service for generating the communications for gifting user 206 to transmit to recipient user 208.

Figure 5A:
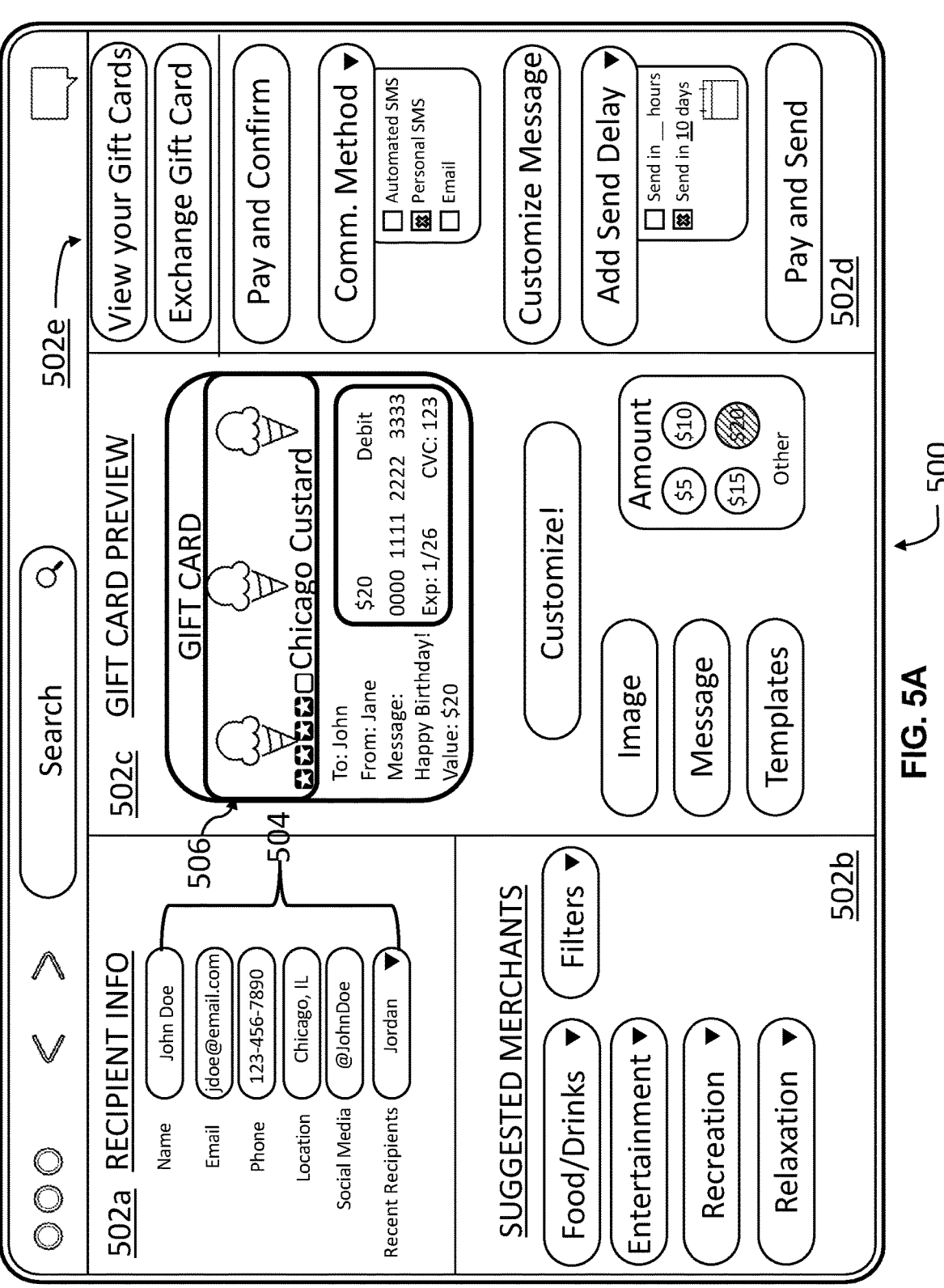
FIG. 5A illustrates a seventh user interface for some embodiments of the present disclosure.

FIG. 5A illustrates an exemplary user interface 500 for some embodiments of the present disclosure. Exemplary user interface 500 may be displayed as part of a desktop application and/or desktop website for system 200 that gifting user 206 and/or recipient user 208 may interface with to send and/or receive gift cards 300.

As shown, exemplary user interface 500 may comprise one or more panes that correspond to the above-described user interfaces including first user interface 400a, second user interface 400b, third user interface 400c, fourth user interface 400d, and sixth user interface 400f. Thus, in some embodiments, exemplary user interface 500 presents a single user interface for obtaining and transmitting a gift card 300 to a recipient user 208. One of skill in the art will appreciate that various modifications to the display of exemplary user interface 500 are within the scope hereof. Furthermore, embodiments of the present disclosure are not limited to being displayed on a single page. Rather, it is envisioned that a desktop application/desktop web page may present one or more pages as discussed above with respect to FIGS. 4A-4F.

As illustrated, exemplary user interface 500 may comprise a first pane 502a that may correspond to first user interface 400a discussed above. First pane 502a may comprise input fields 504 corresponding to location input field 402. A second pane 502b may correspond to second user interface 400b. Various suggested merchants, merchant categories, and the like may be presented in second pane 502b. Additionally, filters for filtering the results queried from search service 212 may be provided.

A third pane 502c may correspond to third user interface 400c. A gift card preview 506 may render preview of gift card 300 and may update in real time or near real time as gifting user 206 adjusts the various parameters thereof and gift card engine 202 communicates with database 210, search service 212, financial institutions module 220, communications module 222, fraud prevention module 224, social media module 218, or any combination thereof.

A fourth pane 502d may correspond to fourth user interface 400d previously discussed. Fourth pane 502d may provide options to select the communication method, customize the message, add a send delay, and the like. Furthermore, exemplary user interface 500 may comprise a fifth pane 502e for accessing gift cards 300 associated with gifting user 206. For example, fifth pane 502e may include an option to exchange a gift card for one with a different merchant/MCC, as discussed above.

Figure 5B:
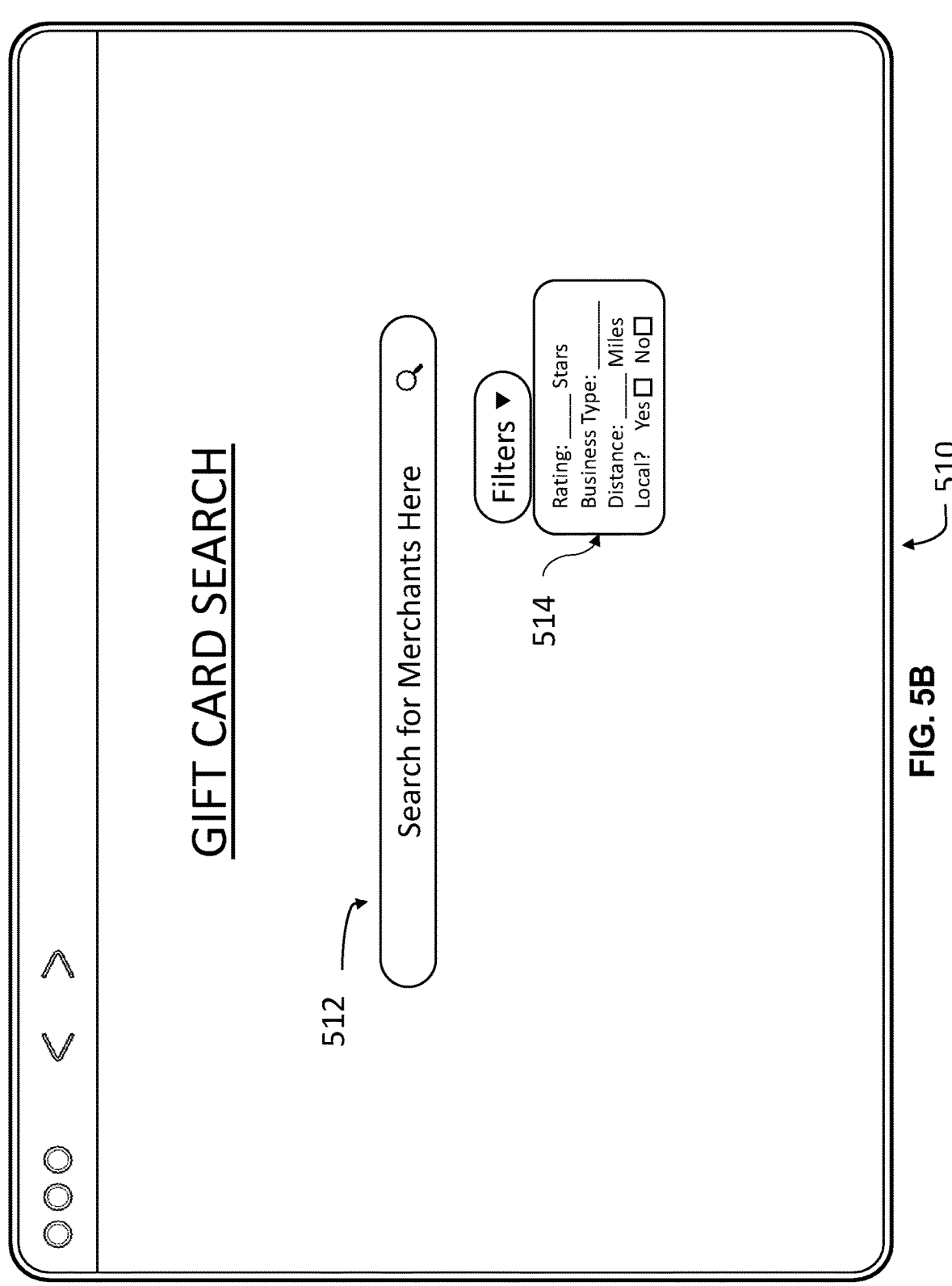
FIG. 5B illustrates an eighth user interface for some embodiments of the present disclosure.

FIG. 5B illustrates an exemplary user interface 510 for some embodiments of the present disclosure. User interface 510 may be displayed as part of a desktop application and/or desktop website for system 200 that gifting user 206 may interface with to search for one or merchants to obtain a gift card 300 therefor. For example, upon accessing the embedded API 242 via white label service 232, gifting user 206 may be directed to a website, application, etc. displaying user interface 510. As shown, user interface 510 may include search input field 512 in which gifting user 206 may input any information that may be utilized by gift card engine 202 to determine relevant merchants. User interface 510 may also include one or more filters 514 that may be used to determine relevant merchants including, but not limited to, rating, business type, distance, locality, any of the filters 214, 410 discussed above, and the like, or any combination thereof. Upon receiving the search and/or filter input from gifting user 206, gift card engine 202 may communicate with search service 212 and/or database 210 as previously discussed and the search results may be presented as discussed with respect to FIG. 5C.

Figure 5C:
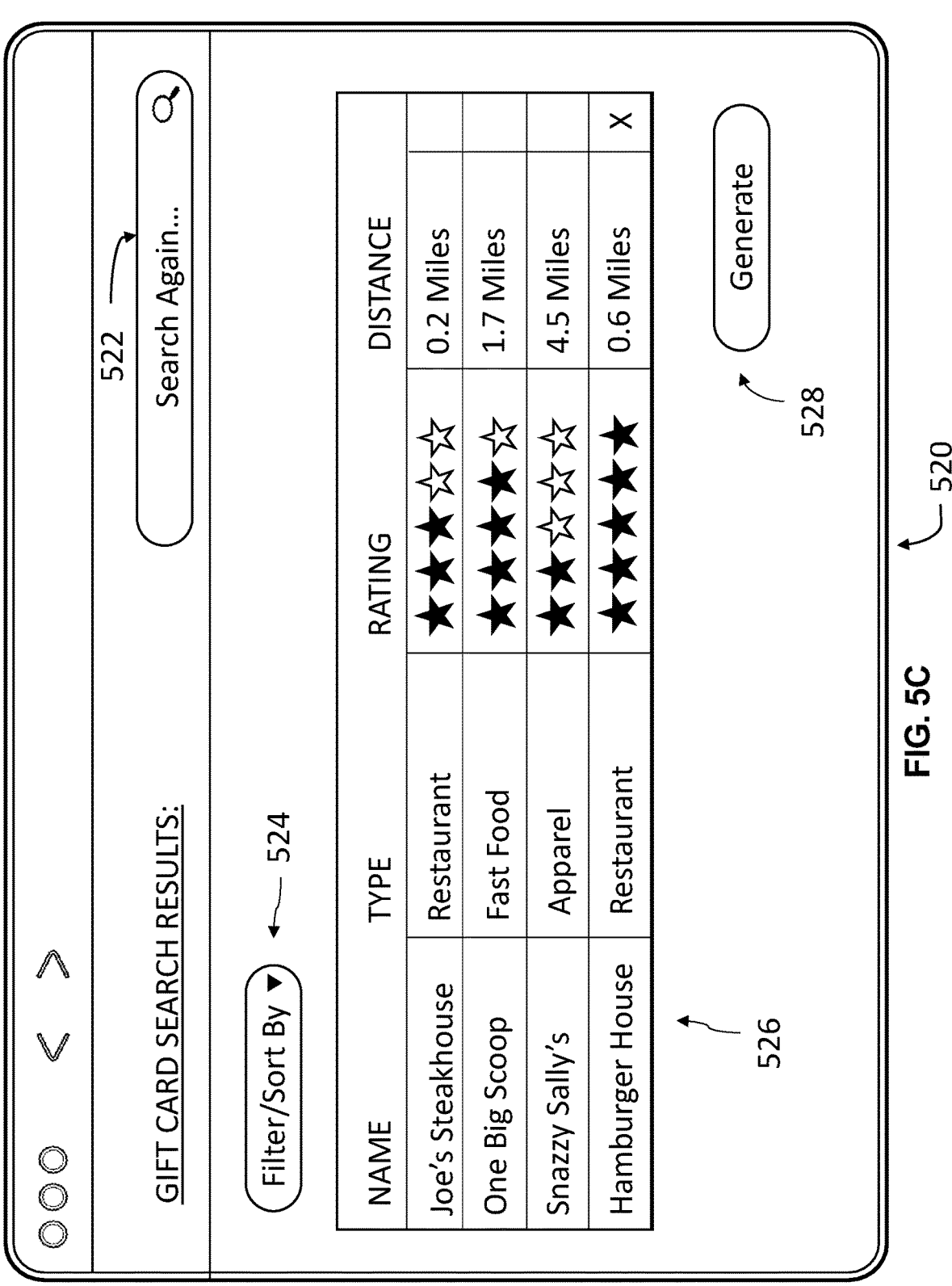
FIG. 5C illustrates a ninth user interface for some embodiments of the present disclosure.

FIG. 5C illustrates a search results interface 520 for some embodiments of the present disclosure. Search results interface 520 may be displayed as part of a desktop application and/or desktop website for system 200 that gifting user 206 may interface with to view and select one or more merchants to generate gift cards for after searching for one or merchants as discussed with respect to FIG. 5B. As shown, search results interface 520 may include search results 526 for displaying one or more merchants that gift card engine 202 determined are relevant to a particular search. Search results 526 may display any number of attributes regarding the one or more merchant results. For example, as depicted, search results 526 may display the name, type, rating, and distance of the merchant results. The attributes may be based on data retrieved from search service 212 and/or database 210. Gifting user 206 may further narrow the search results 526 using filter and sort options 524, and gifting user 206 may input a new search using additional search option 522. As shown in FIG. 5C, gifting user 206 may select one or more merchants and then click generate button 528 to initiate the customization of a gift card associated with the one or more selected merchants, such as via templates 216.

Methods

FIG. 6A illustrates an exemplary method 600 for generating a dynamic and personalized gift card 300 in accordance with embodiments of the present disclosure. As previously discussed, the generation of a gift card 300 may be initialized via a user that accesses system 200 via a third-party application with system 200 embedded therein, via a dedicated mobile/desktop application/browser, or the like. For example, system 200 may be implemented as an add-in to a third-party application. As another example, a user may be browsing an online storefront (e.g., white label service 232) that allows users to purchase gift cards for retailers unassociated with the storefront itself. When the user elects to purchase a gift card via the online storefront, the user may be redirected to a third party gift card issuing service as previously discussed. At either the online storefront or the gift card issuing service, the user may indicate that they wish to purchase a dynamic gift card 300, and the online storefront or gift card issuing service may redirect the user to the system 200, or to the embedded application of system 200 within the online storefront or gift card issuing service, for example.

At step 602, information about recipient user 208 may be received. The information may be received via first user interface 400a as discussed with respect to FIG. 4A, or via any other method. In some embodiments, the information comprises contact information (e.g., name, email, phone number, etc.), location information, social media information, or the like.

Thereafter, at step 604, the information may be analyzed to determine suggestions for the gift card for recipient user 208. For example, the location may be analyzed to filter out merchants that are not in proximity to the location, Likewise, the social media activity of recipient user 208 may be analyzed. It is contemplated that the social media activity of the gifting user 206 may also be analyzed to determine suggestions. For example, if the social media activity of the gifting user 206 indicates that the gifting user 206 recently left a glowing review of a merchant, that merchant may be provided as a suggestion because the gifting user 206 may wish to support the merchant and have recipient user 208 visit the merchant. Likewise, a corpus of social media activity of users sharing one or more commonalities with gifting user 206 and/or recipient user 208 may be analyzed. For example, the social media activity of users in the same location as recipient user 208 may be analyzed and recommendations may be made based on the users' activity.

Next, at step 606, a selection of one or more merchants and/or one or more merchant categories may be received from gifting user 206. The merchants/merchant categories may be selected by the gifting user 206 filtering and searching database 210 as previously discussed. Search results may be presented via second user interface 400b, for example. In some embodiments, database 210 is filtered prior to any user input from gifting user 206. For example, database 210 may filter out certain merchants and/or merchants with certain qualities (e.g., below a threshold rating, below a threshold number of reviews, etc.).

At 608, gift card engine 202 may communicate information about the gift card to financial institutions module 220. For example, information about recipient user 208, the selected merchant and/or merchant category, a template 216 for the gift card, or any combination thereof may be communicated. Accordingly, the gift card may be preapproved by the card issuer.

At step 610, gift card preview 412 may be rendered and displayed to gifting user 206. Rendering gift card preview 412 may comprise retrieving, from at least one of database 210 or search service 212, information associated with the selected merchant. In some embodiments, gift card preview 412 is rendered according to a predefined template 216. In some embodiments, a template 216 is associated with a specific search service 212 or specific card issuer. Personalization information provided by gifting user 206 may be displayed in a personalization region 304. A card details region 306 on gift card 300 may display a placeholder card with the gift card value, MCC, or the like for the gift card 300.

Thereafter, at step 612, gifting user 206 may confirm the details for the gift card 300, select a communication method or methods, and provide payment details for the gift card. As discussed above, SMS, email, and the like may be used to send the gift card 300 to recipient user 208. An SMS and/or email may be generated for gifting user 206 for sending from their personal phone number/email to recipient user 208, which may reduce fraud.

At step 614, the communication may be generated based on the instructions received at step 612. The message may comprise a unique affordance allowing recipient user 208 to accept the gift card as previously discussed. In some embodiments, gift card engine 202 is configured to automatically send the communication (e.g., via an automated system) or gift card engine 202 may generate a message for gifting user 206 to send to recipient user 208.

At step 616, acceptance of the gift card 300 from recipient user 208 may be received. Acceptance may be received by actuation of the unique link, for example. In some embodiments, actuation of the link initiates a tokenized transaction between recipient user 208 and financial institutions module 220 to validate the transaction. Other methods of receiving acceptance are within the scope hereof.

Thereafter, at step 618, gift card engine 202 may interface with financial institutions module 220 to obtain the gift card 300 as discussed above with respect to FIG. 2A. Interfacing with financial institutions module 220 may comprise gift card engine 202 transmitting the card value and MCC to financial institutions module 220 such that financial institutions module 220 can create the gift card 300 accordingly. In some embodiments, gift card engine 202 interfaces with financial institutions module 220 responsive to gifting user 206 paying for gift card 300, and gift card engine 202 instructs financial institutions module 220 to place a hold on activating the gift card 300 until the acceptance is received from recipient user 208. The issued gift card 300 may then be transmitted to recipient user 208. The gift card 300 may be a digital card that may be added to a digital wallet and/or a physical gift card may be obtained and sent to the user.

Figure 6B:
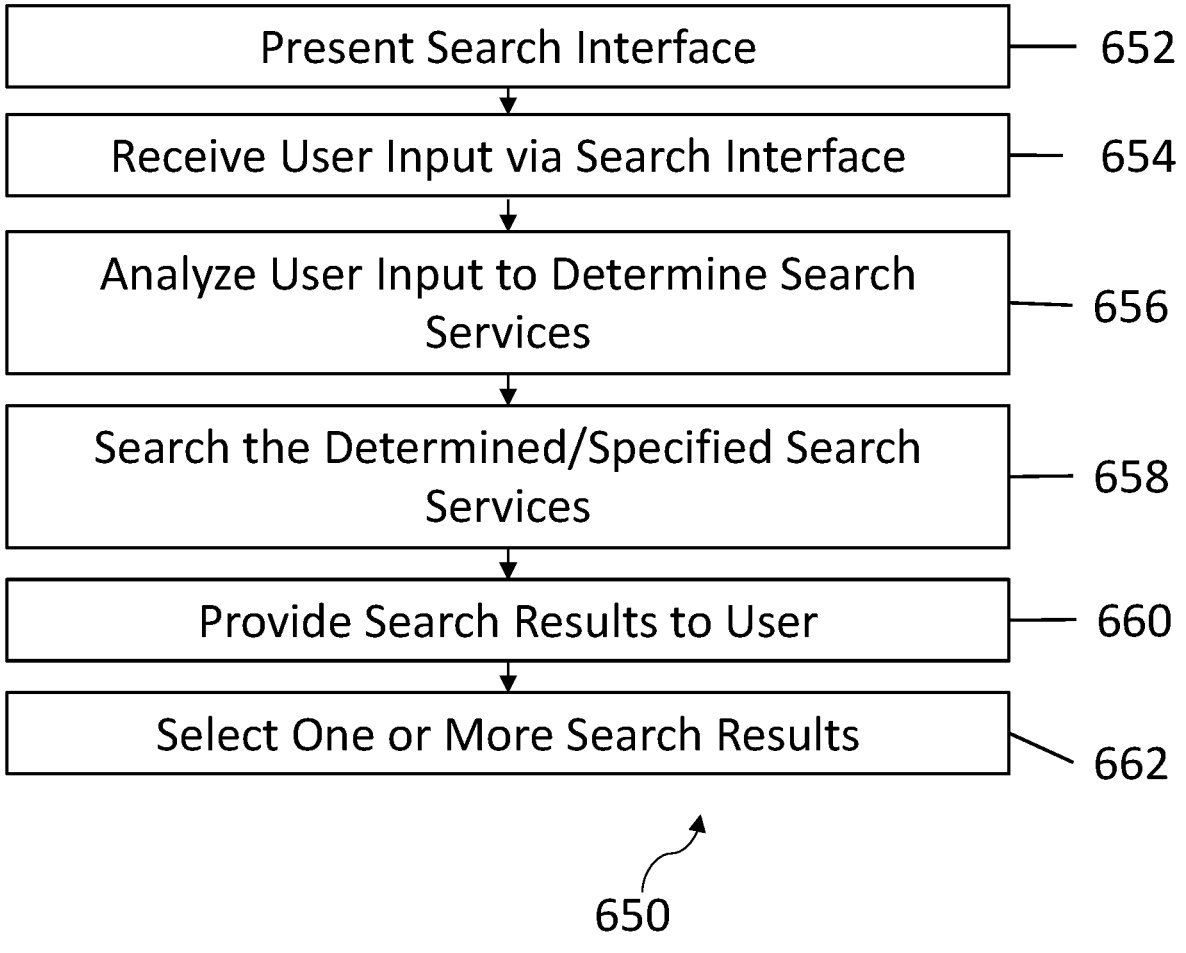
FIG. 6B illustrates a second exemplary method in accordance with embodiments of the present disclosure.

FIG. 6B illustrates a method 650 in accordance with embodiments of the present disclosure. Method 650 illustrates an operational method for system 200 to dynamically generate a gift card 300 for some embodiments.

At step 652, a search interface is presented. The search interface may provide an input field for gifting user 206 to input any number of items to query gift card engine 202 for, including, but not limited to, restaurant name, rating, distance from gifting user 206 or recipient user 208, business type, zip code, city, merchant code, and the like. For example, as depicted in FIG. 5B, gifting user 206 may be presented with a search interface 510 including a search input field 512 with one or more filters 514 to select.

At step 654, user input may be received via the search interface. In some embodiments, user input is in the form of text. In some embodiments, user input is in the form of one or more checked boxes. In some embodiments, user input is a combination of text, checked boxes, and/or any other means of user input, e.g., voice recognition. As discussed above, user input may include any type of information including, but not limited to, the name of a restaurant or business, the average rating, the distance to the user or to any other location (e.g., the location of recipient user 208), whether the business is a local business, the like, or any combination thereof.

At optional step 656, the user input is analyzed to determine one or more search services to search for merchant data. In some embodiments, the user may provide unstructured information to which gift card engine 202 may determine which search service 212 to query. For example, if a user inputs "shoes for a bride", gift card engine 202 may determine that a wedding-focused search engine is more appropriate to query than a restaurant-focused search engine. In such embodiments, gift card engine 202 may use any method now known or later developed for determining an appropriate search service 212 to query including, but not limited to, machine learning, keyword matching, natural language processing, and the like. In some embodiments, the user input may provide specify one or more search services 212 to query and step 656 is omitted. In some embodiments, search services 212 may both be user-specified and determined based on the search input.

At step 658, the determined and/or specified search services are searched. In some embodiments, gift card engine 202 searches a search service 212 by accessing stored information received from search service 212 in database 210 (discussed above). In some embodiments, gift card engine 202 may query search service 212 by directly accessing the information of search service 212 each time a query is received from the user (e.g., via an API provided by the search service 212). The user may select one or more search services to query, or the gift card engine may determine one or more search services to query based on input from the user. In some embodiments, all search services available to the gift card engine may be searched.

At step 660, the search results are provided to the user. As depicted in FIG. 5C, the user may be provided a search results interface 520 which includes search results 526, filter and sort options 524, and an additional search option 522. The user may be able to further narrow down search results 526 by selecting additional criteria under filter and sort options 524. In some embodiments, the user may determine the information that is provided for the search results. For example, if the user does not care what the distance is to each merchant location, the user may opt to not include a column for distance in search results interface 520. Other methods of presenting/communicating search results to a user are within the scope hereof.

At step 662, the user selects one or more of the results for generating a gift card. In some embodiments, as depicted in FIG. 5C, the user may select one or more merchant results and then select the generate button 528 to begin customizing a gift card for the selected merchant. For example, a user may select "Hamburger House" and then press generate button 528 at which point the user can customize and/or select a template for a Hamburger House gift card.

Although the present disclosure has been described with reference to the embodiments illustrated in the attached drawing figures, it is noted that equivalents may be employed, and substitutions made herein without departing from the scope of the present disclosure. Having thus described various embodiments, what is claimed as new and desired to be protected by Letters Patent includes the following:

The invention claimed is:

1. One or more non-transitory computer-readable media comprising computer-executable instructions that, when executed by at least one processor, perform a method of processing real-time merchant information retrieved from an external search service to dynamically generate a gift card configuration, the method comprising:
   receiving, from a first client device of a first user, a search for one or more merchants;
   responsive to receiving the search, retrieving, from the external search service via an application programming interface associated with the external search service, merchant information for the one or more merchants,
   wherein the merchant information is retrieved, in real time, from the external search service upon receipt of the search from the first client device such that a stock-keeping unit of the gift card configuration associated with the one or more merchants is undefined prior to retrieval of the merchant information;
   analyzing the merchant information to determine a merchant category code;
   causing a restriction of the gift card configuration to the merchant category code associated with the merchant information;
   automatically generating a communication comprising an affordance, wherein the affordance is actuatable to receive an acceptance of the gift card configuration from a second user;
   automatically populating, to a messaging application on the first client device of the first user, the communication,
   wherein the communication is editable by the first user via the messaging application,
   wherein the communication is received by a second client device associated with the second user from a phone number associated with the first client device;
   responsive to an actuation of the affordance via the second client device, initiating a verification that the second user is an intended recipient, the verification including at least one of two-factor authentication or a one-time password; and
   responsive to verifying the second user is the intended recipient, transmitting an issuance instruction to a financial institution to issue a gift card corresponding to the gift card configuration such that the gift card contains the restriction to the merchant category code,
   wherein the gift card is prevented from being issued prior to the verification.

2. The one or more non-transitory computer-readable media of claim 1,
   wherein a graphical user interface for receiving the search is accessible via an application embedded within at least one of a third-party application or a third-party website.

3. The one or more non-transitory computer-readable media of claim 2,
   wherein the third-party application or the third-party website is associated with the external search service.

4. The one or more non-transitory computer-readable media of claim 1,
   wherein the search includes at least one of a merchant name, a location, or a merchant type.

5. The one or more non-transitory computer-readable media of claim 1, further comprising:
   receiving, from the first user, an indication of a second external search service to query,
   wherein the external search service is a first external search service; and
   responsive to receiving the search, retrieving, from the second external search service, the merchant information for the one or more merchants.

6. The one or more non-transitory computer-readable media of claim 1, wherein the method further comprises:
   receiving recipient information associated with the second user from the first user;
   determining, based on the recipient information, one or more suggested merchants of the one or more merchants.

7. A method of processing real-time merchant information retrieved from an external search service to dynamically generate a gift card configuration, the method comprising:
   receiving, from a first client device of a first user, a search for one or more merchants;
   responsive to receiving the search, retrieving, from the external search service via an application programming interface associated with the external search service, merchant information for the one or more merchants,
   wherein the merchant information is retrieved, in real time, from the external search service upon receipt of the search from the first client device such that a stock-keeping unit of the gift card configuration associated with the one or more merchants is undefined prior to retrieval of the merchant information;
   analyzing the merchant information to determine a merchant category code;
   causing a restriction of the gift card configuration to the merchant category code associated with the merchant information;
   automatically generating a communication comprising an affordance, wherein the affordance is actuatable to receive an acceptance of the gift card configuration from a second user;
   automatically populating, to a messaging application on the first client device of the first user, the communication,
   wherein the communication is editable by the first user via the messaging application,
   wherein the communication is received by a second client device associated with the second user from a phone number associated with the first client device;
   responsive to an actuation of the affordance via the second client device, initiating a verification that the second user is an intended recipient, the verification including at least one of two-factor authentication or a one-time password; and
   responsive to verifying the second user is the intended recipient, transmitting an issuance instruction to a financial institution to issue a gift card corresponding to the gift card configuration such that the gift card contains the restriction to the merchant category code, wherein the gift card is prevented from being issued prior to the verification.

8. The method of claim 7, wherein the merchant information retrieved from the external search service includes the merchant category code.

9. The method of claim 7, wherein the method further comprises:

filtering at least one of the one or more merchants based on known information associated with the second user.

10. The method of claim 7, wherein the method further comprises:

providing access to a graphical user interface via the application programming interface embedded within the external search service, wherein the search is received via the graphical user interface.

11. The method of claim 7, wherein the method further comprises:

determining a merchant restriction for the gift card configuration; and causing issuance of the gift card based on the merchant restriction, wherein the gift card is only redeemable at a merchant associated with the merchant restriction.

12. The method of claim 7, wherein access to a visual rendering of the gift card is blocked prior to the verification.

13. The method of claim 7, further comprising:

determining if the merchant category code is associated with historical fraudulent activity; and in response to determining the merchant category code is associated with the historical fraudulent activity, alerting the first user.

14. A system for processing real-time merchant information retrieved from an external search service to dynamically generate a gift card configuration, the system comprising:

a graphical user interface for receiving a search from a first user;

an application programming interface configured to query one or more external search services based on the search; and one or more non-transitory computer-readable media comprising computer-executable instructions that, when executed by at least one processor, cause the system to carry out actions, comprising:

receiving, from a first client device of the first user, the search for one or more merchants;

responsive to receiving the search, retrieving, from the one or more external search services via the application programming interface associated with the one or more external search services, merchant information for the one or more merchants, wherein the merchant information is retrieved, in real time, from the external search service upon receipt of the search from the first client device such that a stock-keeping unit of the gift card configuration associated with the one or more merchants is undefined prior to retrieval of the merchant information;

analyzing the merchant information to determine a merchant category code;

causing a restriction of the gift card configuration to the merchant category code associated with the merchant information;

automatically generating a communication comprising an affordance, wherein the affordance is actuatable to receive an acceptance of the gift card configuration from a second user;

automatically populating, to a messaging application on the first client device of the first user, the communication, wherein the communication is editable by the first user via the messaging application, wherein the communication is received by a second client device associated with the second user from a phone number associated with the first client device;

responsive to an actuation of the affordance via the second client device, initiating a verification that the second user is an intended recipient, the verification including at least one of two-factor authentication or a one-time password; and responsive to verifying the second user is the intended recipient, transmitting an issuance instruction to a financial institution to issue a gift card corresponding to the gift card configuration such that the gift card contains the restriction to the merchant category code, wherein the gift card is prevented from being issued prior to the verification.

15. The system of claim 14, wherein the actions further comprise:

receiving, via the graphical user interface, a second search for the one or more merchants; and re-querying the one or more external search services using the application programming interface.

16. The system of claim 14, wherein the actions further comprise:

filtering the one or more merchants based on a filter parameter received from the first user.

17. The system of claim 14, wherein the actions further comprise:

receiving, from the first user, a selection of a template for the gift card configuration, wherein a preview is displayed based on the template.

18. The system of claim 14, determining, based on recipient information associated with the second user, one or more suggested merchants from the one or more merchants for the gift card, the recipient information including social media information associated with the second user.

19. The system of claim 14, wherein the actions further comprise:

wherein a rendering of the gift card is accessible after the verification of the second user.

20. The system of claim 14, wherein the actions further comprise:

responsive to the verification, receiving, from the financial institution, a primary account number associated with the gift card; and generating a link containing the primary account number.

* * * * *